United States Patent
Funase et al.

(10) Patent No.: US 10,515,633 B2
(45) Date of Patent: Dec. 24, 2019

(54) METHOD FOR CONTROLLING SPEECH-RECOGNITION TEXT-GENERATION SYSTEM AND METHOD FOR CONTROLLING MOBILE TERMINAL

(71) Applicant: PANASONIC INTELLECTUAL PROPERTY CORPORATION OF AMERICA, Torrance, CA (US)

(72) Inventors: Kazuki Funase, Osaka (JP); Atsushi Sakaguchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/725,906

(22) Filed: Oct. 5, 2017

(65) Prior Publication Data
US 2018/0040320 A1 Feb. 8, 2018

Related U.S. Application Data

(63) Continuation of application No. 14/792,334, filed on Jul. 6, 2015, now Pat. No. 9,824,688.

(30) Foreign Application Priority Data

Jul. 16, 2014 (JP) ................ 2014-146095

(51) Int. Cl.
*G10L 15/22* (2006.01)
*G10L 15/08* (2006.01)
*H04M 1/725* (2006.01)

(52) U.S. Cl.
CPC ........ *G10L 15/22* (2013.01); *G10L 2015/088* (2013.01); *G10L 2015/221* (2013.01); *H04M 1/72522* (2013.01); *H04M 2250/74* (2013.01)

(58) Field of Classification Search
None
See application file for complete search history.

(56) References Cited

U.S. PATENT DOCUMENTS

| | | | | |
|---|---|---|---|---|
| 5,319,711 | A | * 6/1994 | Servi | ...... H04W 12/06 340/5.74 |
| 5,463,623 | A | * 10/1995 | Grimes | ...... H04L 29/06 370/338 |
| 5,487,069 | A | * 1/1996 | O'Sullivan | ...... H04L 1/006 370/338 |
| 5,490,287 | A | * 2/1996 | Itoh | ...... H04W 52/362 358/442 |

(Continued)

FOREIGN PATENT DOCUMENTS

| | | |
|---|---|---|
| JP | 8-255150 A | 10/1996 |
| JP | 2004-177777 | 6/2004 |
| JP | 2006-238275 | 9/2006 |

*Primary Examiner* — Marcus T Riley
(74) *Attorney, Agent, or Firm* — Greenblum & Bernstein, P.L.C.

(57) ABSTRACT

A method is provided for controlling a device used in a speech-recognition system, in which the device captures speech. The method includes determining a presence or an absence of an object in proximity to the device. The method also includes controlling capturing speech or not capturing speech in accordance with the determination. In the method, the capturing of speech is performed using a microphone of the device.

8 Claims, 24 Drawing Sheets

(56) References Cited

U.S. PATENT DOCUMENTS

| | | | | |
|---|---|---|---|---|
| 5,524,185 | A * | 6/1996 | Na | G06F 3/1204 358/1.15 |
| 5,917,542 | A * | 6/1999 | Moghadam | H04N 1/00912 348/231.99 |
| 5,918,222 | A * | 6/1999 | Fukui | G06Q 10/10 |
| 6,473,070 | B2 * | 10/2002 | Mishra | G06F 3/0346 345/156 |
| 6,587,835 | B1 * | 7/2003 | Treyz | G06Q 20/12 705/14.64 |
| 6,711,677 | B1 * | 3/2004 | Wiegley | H04L 9/3236 713/151 |
| 6,754,631 | B1 * | 6/2004 | Din | G10L 15/26 704/270 |
| 6,816,858 | B1 * | 11/2004 | Coden | G06F 16/748 707/750 |
| 6,839,669 | B1 * | 1/2005 | Gould | G10L 15/22 704/246 |
| 7,016,062 | B2 * | 3/2006 | Ishizuka | G06Q 30/0613 358/1.15 |
| 7,025,256 | B1 * | 4/2006 | Drummond | G06Q 20/32 235/379 |
| 7,428,575 | B1 * | 9/2008 | Motoyama | H04L 51/18 370/352 |
| 7,454,796 | B2 * | 11/2008 | Mazzagatte | G06F 3/1204 726/17 |
| 7,554,684 | B1 * | 6/2009 | Senoo | G03G 15/5016 358/1.15 |
| 7,739,116 | B2 * | 6/2010 | Miyamoto | G06F 17/2745 382/321 |
| 7,941,541 | B2 * | 5/2011 | Chang | H04L 12/2805 709/227 |
| 8,117,268 | B2 * | 2/2012 | Jablokov | G06Q 30/0251 455/412.1 |
| 8,326,636 | B2 * | 12/2012 | White | G10L 15/22 704/275 |
| 8,355,915 | B2 * | 1/2013 | Rao | G10L 15/24 704/243 |
| 8,571,862 | B2 * | 10/2013 | Rao | G06F 3/0237 704/235 |
| 9,292,254 | B2 * | 3/2016 | Simpson | G06F 3/167 |
| 9,575,946 | B2 * | 2/2017 | Curin | B60K 35/00 |
| 9,824,688 | B2 * | 11/2017 | Funase | G10L 15/22 |
| 2002/0087622 | A1 * | 7/2002 | Anderson | H04N 1/00148 709/203 |
| 2003/0002072 | A1 * | 1/2003 | Berkema | G06F 3/1205 358/1.15 |
| 2004/0085745 | A1 * | 5/2004 | Yoshihara | H04M 1/22 362/8 |
| 2007/0239837 | A1 * | 10/2007 | Jablokov | G06Q 30/0251 709/206 |
| 2008/0133228 | A1 * | 6/2008 | Rao | G10L 15/24 704/231 |
| 2009/0124272 | A1 * | 5/2009 | White | G10L 15/193 455/466 |
| 2009/0182560 | A1 * | 7/2009 | White | G10L 15/22 704/235 |
| 2010/0031143 | A1 * | 2/2010 | Rao | G06F 3/0237 715/261 |
| 2010/0121636 | A1 * | 5/2010 | Burke | G06F 3/0346 704/233 |
| 2010/0203824 | A1 * | 8/2010 | Chang | G06F 3/1208 455/3.06 |
| 2012/0215528 | A1 * | 8/2012 | Nagatomo | G10L 15/30 704/211 |
| 2013/0275899 | A1 * | 10/2013 | Schubert | G06F 3/0481 715/765 |
| 2014/0101543 | A1 * | 4/2014 | Curin | B60K 35/00 715/271 |
| 2014/0343950 | A1 * | 11/2014 | Simpson | G06F 3/167 704/275 |
| 2015/0255067 | A1 * | 9/2015 | White | G10L 15/26 704/235 |
| 2016/0019893 | A1 * | 1/2016 | Funase | G10L 15/22 704/235 |
| 2017/0289341 | A1 * | 10/2017 | Rodriguez | G06F 3/04842 |
| 2018/0024791 | A1 * | 1/2018 | Chang | G06F 3/1245 358/1.15 |
| 2018/0040320 | A1 * | 2/2018 | Funase | G10L 15/22 |

* cited by examiner

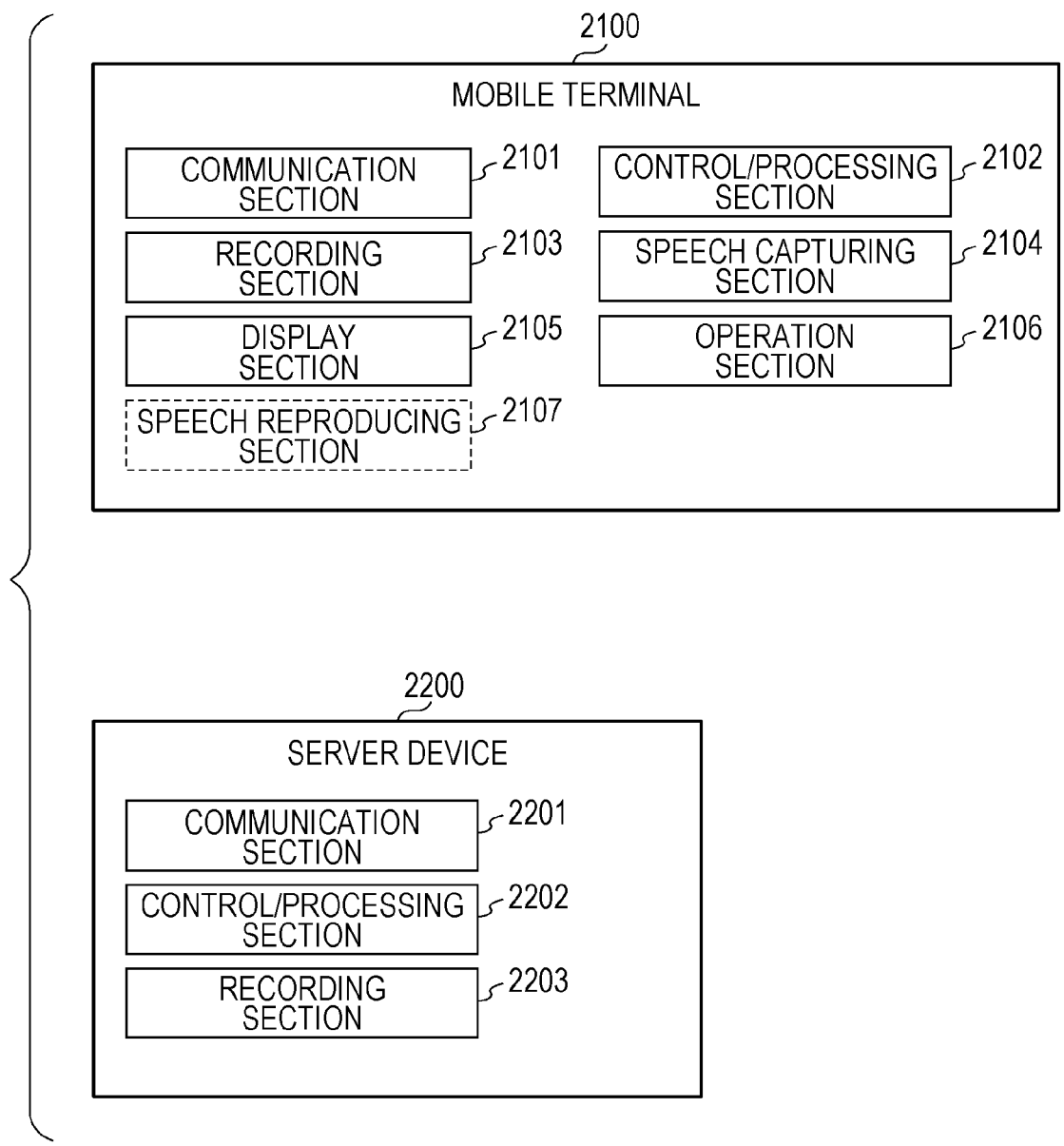

FIG. 7A raito, rettu sutâto za mîtinngu
ôkei
howattu tudeizu azienda?
za zyoinnto deberoppumento obu a supîchi rekogunisyonn sisutemu wizu Panasonic
rigâdinngu za âriâ ofu-za-rekôdo komennto

FIG. 7B

RIGHT, LET'S START THE MEETING
OKAY
WHAT'S TODAY'S AGENDA?
THE JOINT DEVELOPMENT OF A SPEECH RECOGNITION SYSTEM WITH PANASONIC
REGARDING THE EARLIER OFF-THE-RECORD COMMENT

FIG. 7C

| C | RIGHT, LET'S START THE MEETING |
|---|---|
| A | OKAY |
| B | WHAT'S TODAY'S AGENDA? |
| C | THE JOINT DEVELOPMENT OF A SPEECH RECOGNITION SYSTEM WITH PANASONIC |
| D | REGARDING THE EARLIER OFF-THE-RECORD COMMENT |

FIG. 8 ofu-za-rekôdo furomu hia
ofu-za-rekôdo
ofu-za-rekôdo disu
ârîâ ofu-za-rekôdo
ofu-za-rekôdo furomu nau

| SPECIFIC PHRASE | DELETION CANDIDATE PHRASE POSITIONAL INFORMATION |
|---|---|
| OFF-THE-RECORD | a |
| OFF-THE-RECORD THIS | b |
| EARLIER OFF-THE-RECORD | b |
| OFF-THE-RECORD FROM NOW | a |
| OFF-THE-RECORD FROM HERE | a |
| DELETION | a |
| DELETION OF THIS | b |
| EARLIER OFF-THE-RECORD | b |
| OFF-THE-RECORD FROM NOW | a |
| OFF-THE-RECORD FROM HERE | a |
| DELETE | a |
| ⋮ | ⋮ | delîsyon
delîsyon obu disu
ârîâ ofu-za-rekôdo
delîto
ofu-za-rekôdo furomu hia
ofu-za-rekôdo furomu nau

METHOD FOR CONTROLLING SPEECH-RECOGNITION TEXT-GENERATION SYSTEM AND METHOD FOR CONTROLLING MOBILE TERMINAL

CROSS REFERENCE TO RELATED APPLICATION

This is continuation application of U.S. patent application Ser. No. 14/792,334, filed Jul. 6, 2015, which claims priority to Japanese Application No. 2014-146095, filed Jul. 16, 2014. The disclosures of these documents, including the specification, drawings, and claims, are incorporated herein by reference in their entirety.

TECHNICAL FIELD

The present disclosure relates to a method for controlling a speech-recognition text-generation system that captures speech, converts the captured speech into text through speech recognition, and presents the text to a user by displaying the text on a display terminal, and the present disclosure relates to a method for controlling a mobile terminal used in the system.

DESCRIPTION OF THE RELATED ART

Studies have been conducted on taking the minutes of a meeting through capturing and converting speech into text data and recording. Furthermore, a study has been conducted on a system that creates the minutes of a meeting without recording unnecessary utterances in a meeting as described in Japanese Unexamined Patent Application Publication No. 2004-177777.

SUMMARY

In one general aspect, the techniques disclosed here feature a method for controlling a speech-recognition text-generation system that captures speech, converts the captured speech into character strings through speech recognition, the techniques includes: determining whether or not the character strings include a predetermined phrase; specifying, in a case where the predetermined phrase is determined to be included, a character string associated with the predetermined phrase among the character strings as a first character string which is a deletion candidate; and displaying the first character string in a first display form on a display terminal and displaying a second character string, which is a character string other than the first character string, in a second display form on the display terminal.

According to the method of the present disclosure for controlling a speech-recognition text-generation system, even utterances judged unnecessary in a meeting can be checked later, and minutes of a meeting can be easily edited.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2A is a diagram illustrating an example of a configuration of each device illustrated in FIGS. 1A through 1D;

FIG. 7A is a diagram illustrating an example of a result of conversion of the speech data into text by the present system according to Embodiment 1;

FIG. 7B is a diagram illustrating an example of a result of conversion of the speech data into text by the present system according to Embodiment 1;

FIG. 7C is a diagram illustrating an example of a result of conversion of the speech data into text by the present system according to Embodiment 1;

FIG. 8 is a diagram illustrating an example of a table stored in the present system according to Embodiment 1 in which a specific phrase and associated information concerning the position of a deletion candidate phrase are managed;

DETAILED DESCRIPTION

Figure 1A:
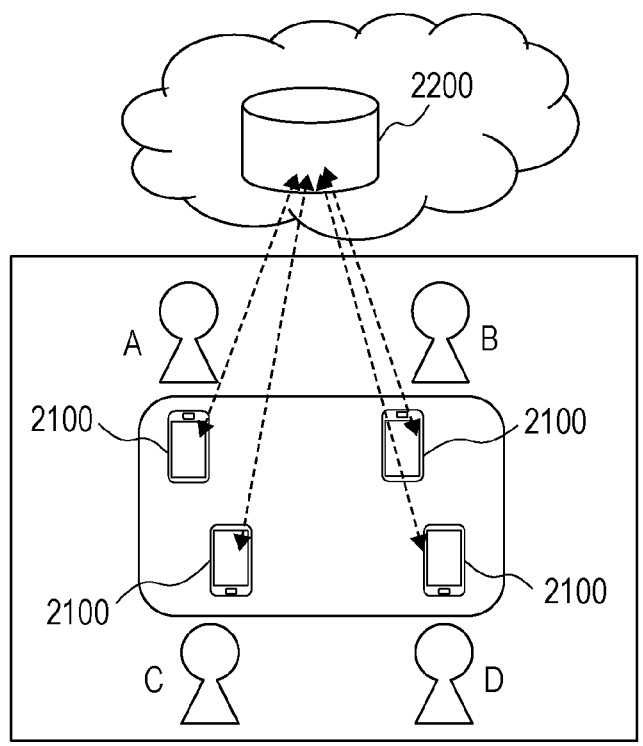
FIG. 1A is a diagram illustrating an example of a configuration of the present system according to Embodiment 1.

Underlying Knowledge Forming Basis of Present Disclosure

In general, the minutes of a meeting are taken as follows. A person who is in charge of taking the minutes of a meeting records speech of meeting participants in a meeting by using a notebook or a PC (personal computer) and then edits the recorded speech so that the points and conclusion of the meeting are clarified. That is, the original purpose of the minutes of a meeting is not only to record all spoken words in a meeting, but also to edit the recorded speech so that the points of the meeting are clarified.

According to a conventional meeting minutes system, only optimum utterances in a meeting are recorded. Since utterances that are judged unnecessary in the meeting are not recorded, such utterances cannot be checked later. Moreover, a method for easily editing recorded utterances in a meeting is not fully considered.

Japanese Unexamined Patent Application Publication No. 2004-177777 describes a method for creating minutes of a meeting in which a specific phrase such as "off-the-record" is detected, and recording of an utterance that follows the detected phrase is omitted. According to this method, however, the minutes of a meeting in which the conclusion and the points of the meeting are clarified cannot be created, although unnecessary utterances can be excluded from the minutes of the meeting.

Moreover, Japanese Unexamined Patent Application Publication No. 2004-177777 does not disclose anything about a method for easily editing minutes of a meeting after conversion into text. Even if the method described in Japanese Unexamined Patent Application Publication No. 2004-177777 is used, a person who edits the minutes of a meeting still needs to run over recorded text and specify unnecessary or necessary parts of the minutes of the meeting.

Furthermore, according to the method in which a specific phrase is detected, as in the system described in Japanese Unexamined Patent Application Publication No. 2004-177777, this specific phrase must be uttered in a meeting at every necessary timing. This may undesirably obstruct the progress of the meeting.

As a method other than the method described in Japanese Unexamined Patent Application Publication No. 2004-177777 in which a specific phrase is detected, Japanese Unexamined Patent Application Publication No. 2006-238275 describes a method in which speech that is captured while a button exclusive to a meeting minutes system is being pressed is not recorded.

However, according to the technique described in Japanese Unexamined Patent Application Publication No. 2006-238275, a special device exclusive to the system is needed. In recent years, a study has been conducted on a system for easily creating the minutes of a meeting anywhere by capturing speech by using participants' own terminals (smartphones or the like) instead of using a special device. In such a system, use of a special device as in Japanese Unexamined Patent Application Publication No. 2006-238275 contradicts the original purpose of "easily creating the minutes of a meeting anywhere".

A method of the present disclosure for controlling a speech-recognition text-generation system that captures speech, converts the captured speech into character strings through speech recognition, includes: determining whether or not the character strings include a predetermined phrase; specifying, in a case where the predetermined phrase is determined to be included, a character string associated with the predetermined phrase among the character strings as a first character string which is a deletion candidate; and displaying the first character string in a first display form on a display terminal and displaying a second character string, which is a character string other than the first character string, in a second display form on the display terminal.

The method may be arranged such that the first character string is a character string located before or after the predetermined phrase among the character strings.

The method may be arranged such that the predetermined phrase is a first phrase that specifies a character string before the predetermined phrase as a deletion candidate or a second phrase that specifies a character string after the predetermined phrase as a deletion candidate; the first character string is the character string located before the predetermined phrase in a case where the predetermined phrase is the first phrase; and the second character string is the character string located after the predetermined phrase in a case where the predetermined phrase is the second phrase.

The method may be arranged such that the first display form is a display form in which the first character string is displayed at a lower luminance than that of the second character string displayed in the second display form.

The method may be arranged such that the first display form is a display form in which the first character string is displayed in a color different from that of the second character string displayed in the second display form.

The method may include: deleting the display of the first character string by selection of a display region of the first character string on the display terminal. The method may be arranged such that at least one of the determining, the specifying and the displaying is performed by a processor.

A method of the present disclosure for controlling a mobile terminal used in a speech recognition system in which the mobile terminal captures speech, the captured speech is converted into character strings through speech recognition in the mobile terminal or is transmitted to an external device and is converted into character strings through speech recognition in the external device, and the character strings are displayed on the mobile terminal or another display device, may include: determining the presence or absence of an object in proximity to the mobile terminal; and switching between whether or not processing for displaying the character strings on the display device is performed in accordance with the determination.

The method may be arranged such that the processing for displaying the character strings is not performed by stopping speech capturing by the mobile terminal when an object is in proximity to the mobile terminal; and the processing for displaying the character strings is performed by starting speech capturing by the mobile terminal when no object is in proximity to the mobile terminal.

The method may be arranged such that the processing for displaying the character strings is not performed by stopping speech capturing by the mobile terminal when no object is in proximity to the mobile terminal; and the processing for displaying the character strings is performed by starting speech capturing by the mobile terminal when an object is in proximity to the mobile terminal.

The method may be arranged such that the processing for displaying the character strings is not performed by stopping transmission of the speech captured by the mobile terminal to the external device when an object is in proximity to the mobile terminal; and the processing for displaying the character strings is performed by transmitting the speech captured by the mobile terminal to the external device when no object is in proximity to the mobile terminal.

The method may be arranged such that the processing for displaying the character strings is not performed by stopping speech recognition of the speech captured by the mobile terminal when an object is in proximity to the mobile terminal; and the processing for displaying the character strings is performed by performing speech recognition of the speech captured by the mobile terminal when no object is in proximity to the mobile terminal. The method may be arranged such that at least one of the determining, and the switching is performed by a processor included in the mobile terminal.

A method of the present disclosure for controlling a mobile terminal used in a speech recognition system in which the mobile terminal captures speech, the captured speech is converted into character strings through speech recognition in the mobile terminal or is transmitted to an external device and is converted into character strings through speech recognition in the external device, and the character strings are displayed on the mobile terminal or another display device, may include: detecting an angle of the mobile terminal with respect to a horizontal plane; and switching between whether or not processing for displaying the character strings on the display device is performed in accordance with the detected angle of the mobile terminal.

The method may be arranged such that the processing for displaying the character strings is not performed by stopping speech capturing by the mobile terminal when the angle of the mobile terminal is not substantially horizontal; and the processing for displaying the character strings is performed by starting speech capturing by the mobile terminal when the angle of the mobile terminal is substantially horizontal.

The method may be arranged such that when the detected angle of the mobile terminal is substantially horizontal, (i) touch panel operation of the mobile terminal is disabled, (ii) it is determined whether or not an object is in proximity to the mobile terminal, (iii) it is switched between whether or not processing for displaying the character strings on the display device is performed in accordance with the determination. The method may include: enabling an operation of a touch panel included in the mobile terminal when the detected angle of the mobile terminal is not substantially horizontal, and switching to the not-processing for displaying the character strings when the detected angle of the mobile terminal is not substantially horizontal. The method may be arranged such that at least one of the determining, and the switching is performed by a processor included in the mobile terminal.

Embodiment 1

Overview of System

FIG. 1 illustrates an overview of a system for creating minutes of a meeting (or a system for creating minutes of a meeting by using a speech-recognition text-generation system) according to the present embodiment. Four examples (FIGS. 1A through 1D) are illustrated as examples of an overview of the system for creating minutes of a meeting. However, the present embodiment is not limited to these examples. These examples are described below.

In the example of FIG. 1A, meeting participants A through D each have a mobile terminal 2100. The mobile terminals 2100 of the meeting participants A through D transmit and receive data to and from a server device 2200 provided remotely via the Internet. A method for creating minutes of a meeting by using the meeting minutes system illustrated in FIG. 1A is described below.

First, the mobile terminals 2100 of the meeting participants A through D capture speech of the meeting participants. Then, the mobile terminals 2100 of the meeting participants A through D transmit the captured speech data to the server device 2200 in real time. The server device 2200 converts the speech data received from the mobile terminals 2100 of the meeting participants A through D into text. Then, the server device 2200 collates, as minutes of the meeting, the pieces of text information on the basis of the date and time of receiving the speech data. Details of the method for creating minutes of a meeting will be described later. The server device 2200 transmits the created minutes of the meeting to each of the mobile terminals 2100. Note that the mobile terminals 2100 may be any devices capable of capturing sound.

Figure 1B:
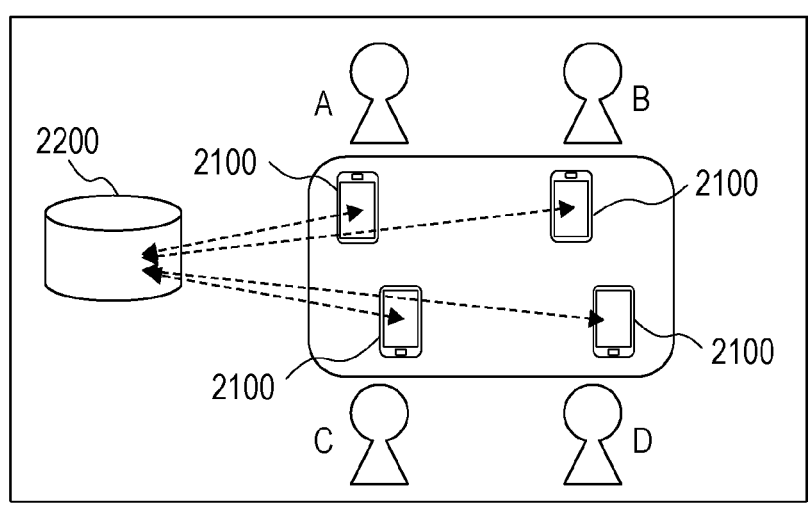
FIG. 1B is a diagram illustrating an example of a configuration of the present system according to Embodiment 1.
Figure 2B:
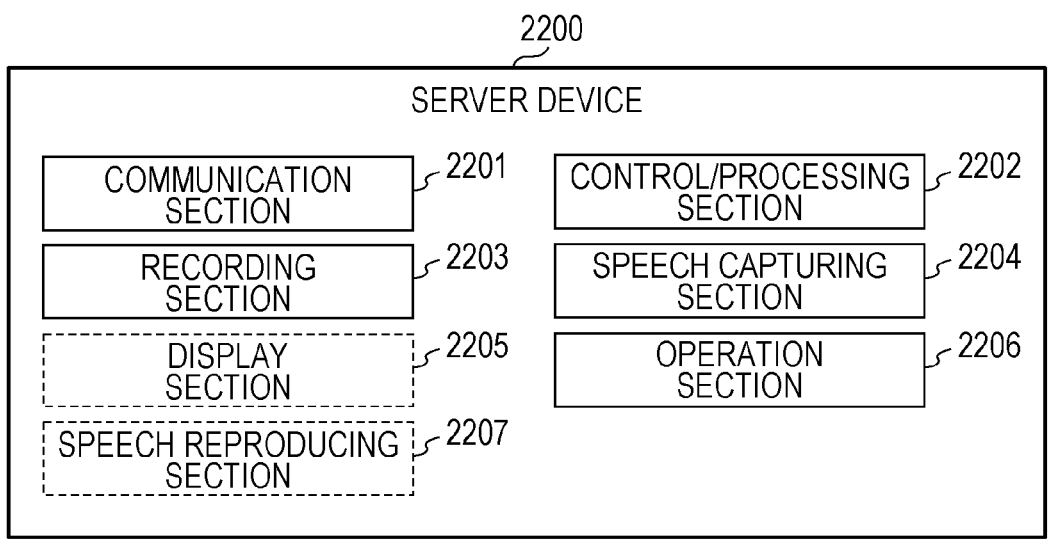
FIG. 2B is a diagram illustrating an example of a configuration of a device illustrated in FIGS. 1A through 1D.

In the example of FIG. 1B, meeting participants A through D each have a mobile terminal 2100. The mobile terminals 2100 of the meeting participants A through D transmit and receive data to and from the server device 2200 provided locally via wired communication or wireless communication. The example of FIG. 2B is different from the example of FIG. 1A in that the server device 2200 is provided locally, but the other points are similar to those in the example of FIG. 1A and therefore are not repeated. Wireless transmission and reception of data to and from the server device 2200 in the example of FIG. 1B can be accomplished by using a wireless standard such as Wifi or Bluetooth (Registered Trademark). Note that the mobile terminals 2100 may be any devices capable of capturing sound.

Figure 1C:
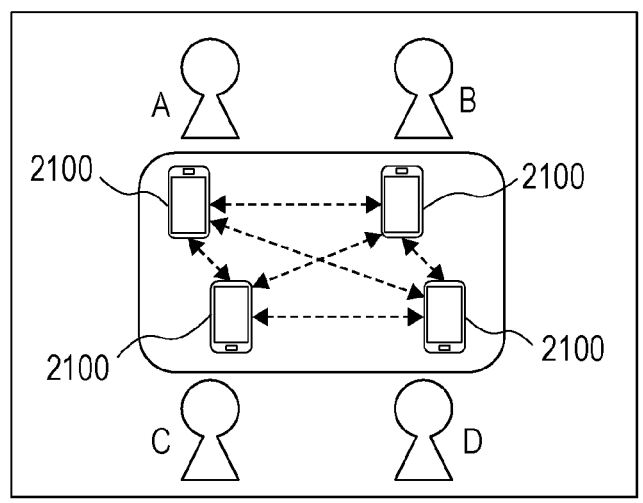
FIG. 1C is a diagram illustrating an example of a configuration of the present system according to Embodiment 1.

In the example of FIG. 1C, meeting participants A through D each have a mobile terminal 2100. The mobile terminals 2100 of the meeting participants A through D transmit and receive data to and from each other via the Internet. A method for creating minutes of a meeting by using the meeting minutes system illustrated in FIG. 1C is described below.

First, speech of each meeting participant A through D is captured by the respective mobile terminal 2100. Then, the mobile terminals 2100 transmit the speech data to one (hereinafter referred to as a host terminal) of the mobile terminals 2100 in real time. The host terminal converts the speech data received from the mobile terminals 2100 into text. Then, the host terminal collates, as minutes of a meeting, the pieces of text information on the basis of the date and time of receiving the speech data. Details of the method for creating minutes of a meeting will be described later. The host terminal transmits the created minutes of a meeting to each of the mobile terminals 2100. Note that the mobile terminals 2100 may be any devices capable of capturing sound.

Figure 1D:
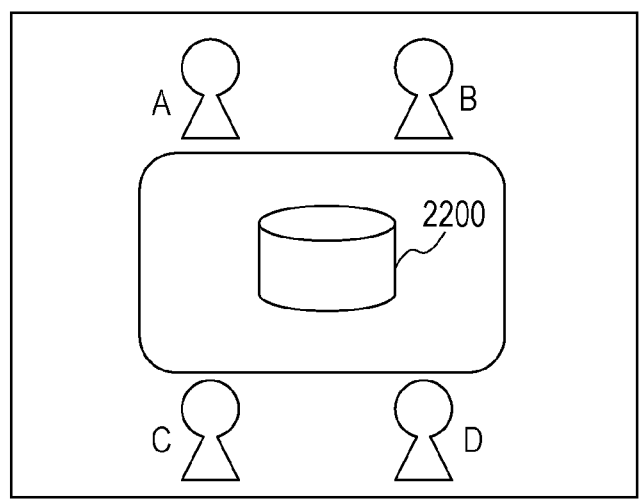
FIG. 1D is a diagram illustrating an example of a configuration of the present system according to Embodiment 1.

In the example of FIG. 1D, the server device 2200 includes all kinds of functions from speech capturing to creation of minutes of a meeting. A method for creating minutes of a meeting is similar to that in the aforementioned examples and description thereof is not repeated.

A configuration of each device and a flow of processing for creating minutes of a meeting are described below. Basically, an example in which the system of FIG. 1A is used is described below.

Configuration of Each Device

A configuration of each device in the system for creating minutes of a meeting according to Embodiment 1 is described below with reference to FIG. 2A. The following discusses a configuration of each device in the system described in FIG. 1A but is not limited to this. The server device 2200 may include one or more of the elements/units of the mobile terminal 2100 or the mobile terminal 2100 may include one or more of the elements/units of the server device 2200.

The mobile terminal 2100 includes a communication section 2101, a control/processing section 2102, a recording section 2103, a speech capturing section 2104, a display section 2105, an operation section 2106, and a speech reproducing section 2107.

The communication section 2101 may include, for example, a processing circuit (communication circuit) that performs communication. The communication section 2101 transmits and receives data to and from the server device 2200 and other devices via the Internet. Note that the communication section 2101 may transmit and receive data to and from the server device 2200 via a wired line physically connected to the server device 2200.

The control/processing section 2102 processes all kinds of acquired data and controls all kinds of constituent elements. For example, the control/processing section 2102 processes speech data captured by the speech capturing section 2104 that will be described later. The control/processing section 2102 is an electronic component including a processing circuit having a data processing function such as a so-called CPU (Central Processing Unit) or embedded system (also called microprocessor).

The control/processing section 2102 is configured to function according to the CPU's execution of programs stored, for example, in a memory (not illustrated) or the recording section 2103.

Alternatively, the control/processing section 2102 may be realized by an embedded system in which functions of the control/processing section 2102 realized by execution of the programs are implemented.

Specific functional elements of the control/processing section 2102 will be described later with reference to FIG. 3.

The recording section 2103 records all kinds of data. For example, the recording section 2103 records the speech data captured by the speech capturing section 2104 temporarily or for a predetermined period. The recording section 2103 is a writable recording medium such as a memory or hard disc.

The speech capturing section 2104 captures speech. The speech capturing section 2104 may include, for example, a processing circuit that processes captured speech. The captured speech data is, for example, subjected to AD conversion. Then, the speech data is recorded in the recording section 2103, processed by the control/processing section 2102, or transmitted to the server device 2200 by the communication section 2101. The speech capturing section 2104 is, for example, a microphone.

The display section 2105 displays all kinds of information. The display section 2105 is, for example, a display.

The operation section 2106 is an interface that accepts operation/input from a user. An input method is not limited in particular and can be a touch panel type input method or may be a button type input method.

The speech reproducing section 2107 reproduces speech. The speech reproducing section 2107 is, for example, a speaker. The speech reproducing section 2107 is not an essential element.

The server device 2200 includes a communication section 2201, a control/processing section 2202, and a recording section 2203.

The communication section 2201 may include, for example, a processing circuit (communication circuit) that performs communication. The communication section 2201 receives speech data captured by each mobile terminal 2100 and transmits information processed by the control/processing section 2202 that will be described later to each mobile terminal 2100.

The control/processing section 2202 processes the captured speech data.

The control/processing section 2202 is an electronic component that includes a processing circuit having a data processing function such as a so-called CPU or embedded system. The control/processing section 2202 functions according to the CPU's execution of programs stored, for example, in a memory (not illustrated) or the recording section 2203.

Alternatively, the control/processing section 2202 may be realized by an embedded system in which functions of the control/processing section 2202 realized by execution of the programs are implemented.

Processing performed by the control/processing section 2202 etc. will be described later.

The recording section 2203 records data (e.g., speech data) acquired from all kinds of mobile terminals. The recording section 2203 is a writable recording medium such as a memory or hard disc.

The configuration of each device has been described above, but the mobile terminal 2100 and the server device 2200 need not necessarily include all of the elements illustrated in FIG. 2A. One or more of the elements may be omitted.

FIG. 2B is a diagram illustrating an example of a configuration of the server device 2200 in the system illustrated in FIG. 1D. In this case, as illustrated in FIG. 1D, the server device 2200 is a device exclusive to the meeting minutes system, and all of the elements are included in the server device 2200. The elements are similar to those of FIG. 2A and given identical names and reference symbols, and description thereof is not repeated.

Functional Elements of Control/Processing Section

Figure 3:
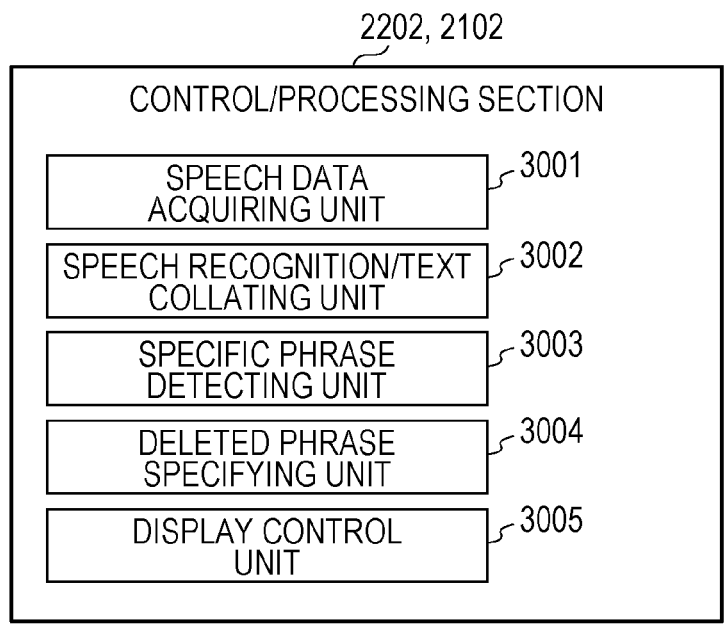
FIG. 3 is a diagram illustrating an example of functional elements of a control/processing section of the present system.

FIG. 3 is a diagram illustrating an example of functional elements of the control/processing section 2102 or the control/processing section 2202. Each element is described below with reference to FIG. 3. In a case where the control/processing section 2102 includes one or more of the functional elements of FIG. 3, the control/processing section 2202 just needs to include functional elements that are not included in the control/processing section 2102 among the functional elements illustrated in FIG. 3. In a case where the control/processing section 2202 includes all of the functional elements of FIG. 3, it is possible that the control/processing section 2102 include none of the functional elements illustrated in FIG. 3. In this case, the communication section 2101 transmits speech data captured by the speech capturing section 2104 of the mobile terminal 2100 to the server device 2200 without any processing. The following discusses a case where the control/processing section 2202 includes all of the functional elements of FIG. 3 but is not limited to this.

Figure 4A:
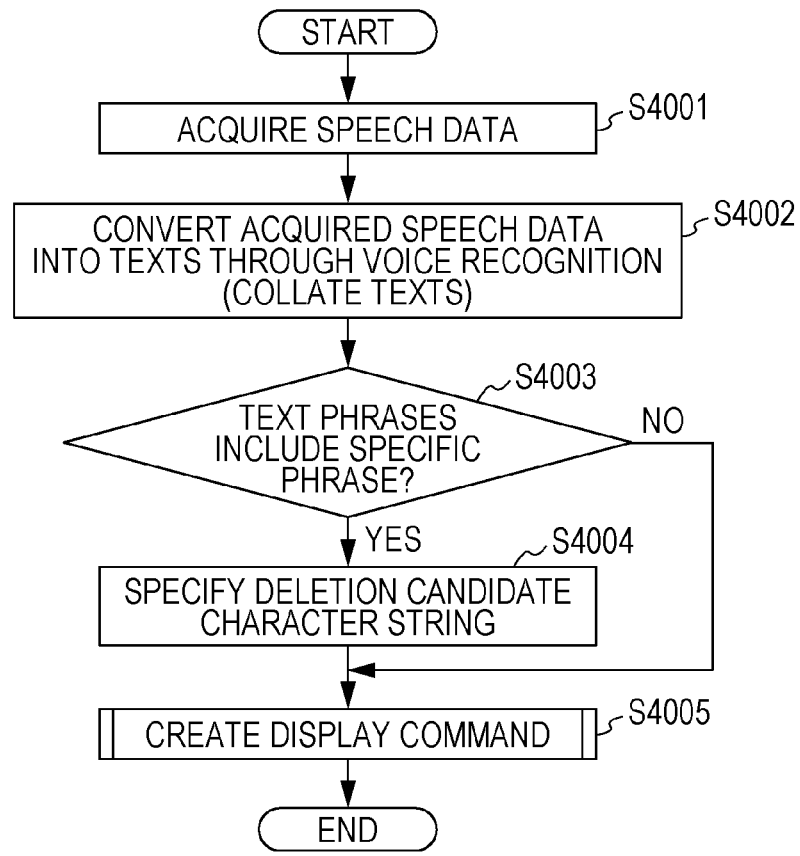
FIG. 4A is a flow chart illustrating an example of processing of the present system according to Embodiment 1.

The control/processing section 2202 includes a speech data acquiring unit 3001, a speech recognition/text collating unit 3002, a specific phrase detecting unit 3003, and a deleted phrase specifying unit 3004. An operation and a processing flow of each functional element is described below with reference to the flow chart of FIG. 4A.

Figure 5:
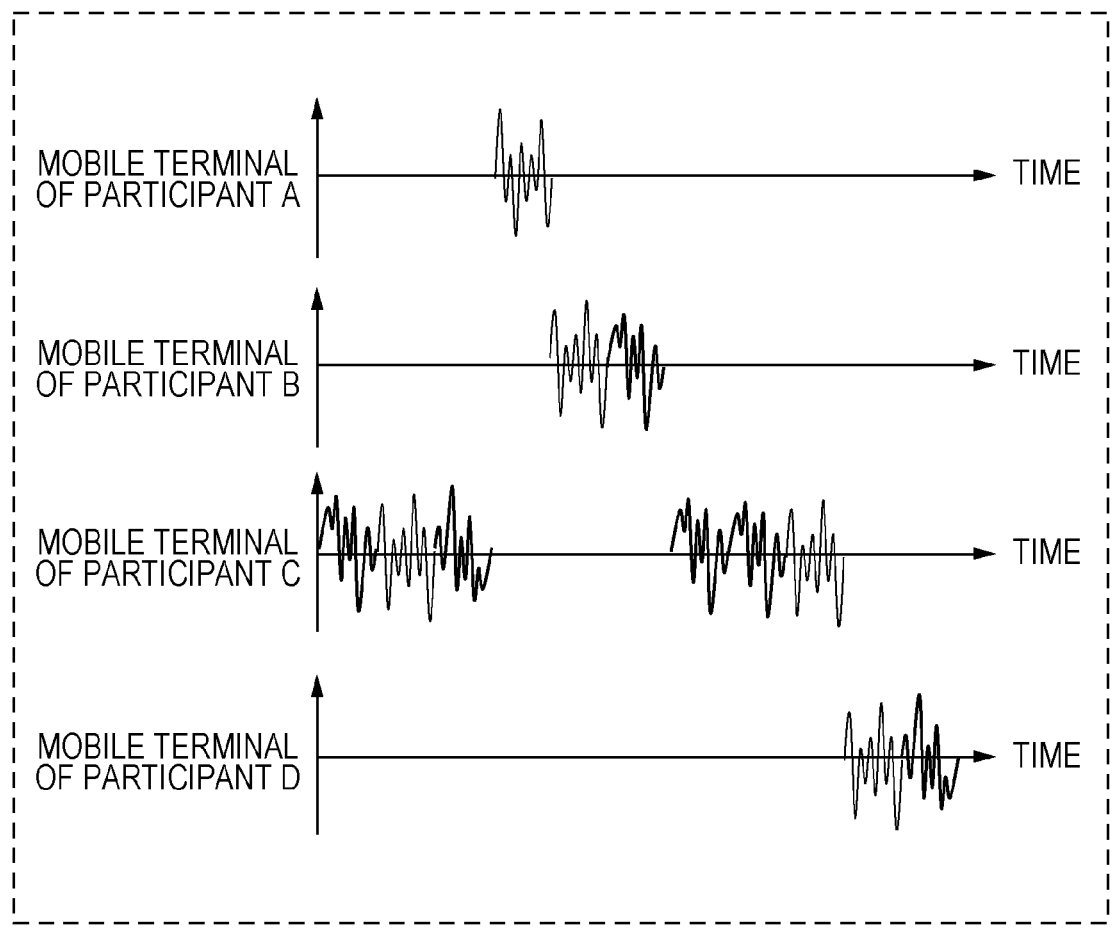
FIG. 5 is a diagram illustrating an example of speech data captured by the present system according to Embodiment 1.

First, in Step S4001, the speech data acquiring unit 3001 acquires speech data captured by the speech capturing section 2104 of each mobile terminal 2100 via the communication section 2101 and the communication section 2201. The speech data acquiring unit 3001 may acquire speech data recorded in the recording section 2103 or the recording section 2203. FIG. 5 illustrates an image of the acquired speech data. FIG. 5 illustrates a relationship between the acquired speech data and a time in the mobile terminals 2100 of the meeting participants A through D.

As illustrated in FIG. 5, the pieces of speech data from the mobile terminals 2100 of the meeting participants A through D are transmitted to the server device 2200 in chronological order and are then acquired and stored by the speech data acquiring unit 3001. FIG. 5 illustrates that speech data is acquired from each of the terminals of the four meeting participants A through D in the example illustrated in FIG. 1A.

Next, in Step S4002, the speech recognition/text collating unit 3002 converts each of the pieces of speech data acquired by the speech data acquiring unit 3001 into text through speech recognition. Then, the speech recognition/text collating unit 3002 collates the text and stores the collated text in the recording section 2203. Note that in the case of a system in which each mobile terminal does not capture speech (a mobile terminal is not used) and a single device performs all kinds of processing as illustrated in FIG. 1D, the processing for collating text is unnecessary.

Figure 6:
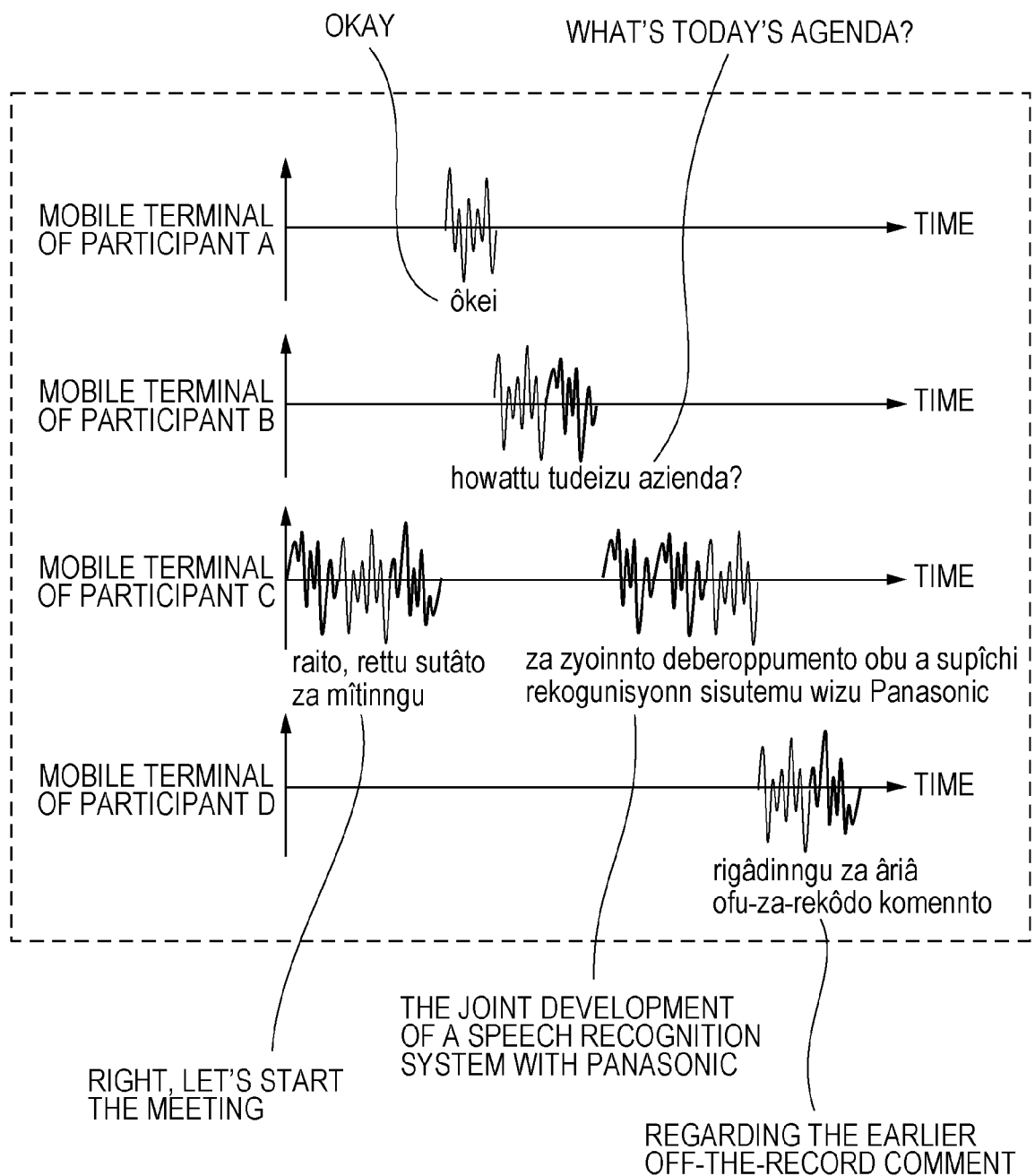
FIG. 6 is a diagram illustrating an example of speech data captured by the present system according to Embodiment 1 and a result of speech recognition.

FIG. 6 illustrates a result of speech recognition of the pieces of speech data captured in FIG. 5. FIGS. 7A through 7C illustrate an example of how pieces of text are collated and stored in the recording section 2203. The character strings obtained through speech recognition may be collated and stored in chronological order as illustrated in FIG. 7A. Alternatively, an arrangement is also possible in which the speech recognition/text collating unit 3002 includes a unit for converting the text information into kanji characters, and the phrases that have been converted into kanji characters are stored in the recording section 2203 in chronological order as illustrated in FIG. 7B.

Alternatively, since the speech recognition/text collating unit 3002 can recognize which speech data has been captured by which mobile terminal 2100, an arrangement is also possible in which the pieces of speech data are converted into pieces of text that are distinguishable from each other and are then stored in the recording section in chronological order as illustrated in FIG. 7C. By thus converting the captured speech data into text associated with the respective mobile terminals 2100, later management of minutes of a meeting becomes easier.

Since it is assumed that the mobile terminals 2100 are placed close to the respective participants, as illustrated in FIG. 1A, it can be assumed that, of speech data captured by a mobile terminal 2100, the voice of the participant in possession of the mobile terminal 2100 exhibits the highest sound pressure level. Therefore, the speech recognition/text collating unit 3002 may convert, into text, only pieces of speech data whose sound pressure levels are equal to or higher than a certain level among the captured pieces of speech data. This allows the speech recognition/text collating unit 3002 to estimate that speech data captured by the mobile terminal 2100 in the possession of participant A is data of speech of participant A.

The control/processing section 2102 of each mobile terminal 2100 may include a speaking participant identifying unit (not illustrated). The speaking participant identifying unit identifies the participant corresponding to the speech data captured by each mobile terminal 2100 and specifies speech of the participant in possession of this mobile terminal 2100. Then, the speaking participant identifying unit transmits only the specified speech of the participant to the communication section 2201 of the server device 2200 via the communication section 2101. Since the mobile terminal 2100 of each participant is a terminal such as a smartphone, voice of each participant is often captured in advance during a telephone call. It is therefore easy to store speech data of the participant in possession of the mobile terminal 2100 in advance. For example, speech data of the participant A is stored in advance in the mobile terminal 2100 of the participant A. In this case, the mobile terminal 2100 of the participant A specifies only the speech data of the participant A by cross-checking the captured speech data and the stored speech data, and then transmits the specified speech data to the server device 2200. This allows the mobile terminal 2100 of the participant A to transmit only the speech data of the participant A to the server device 2200 even in a case where the mobile terminal 2100 of the participant A collects speech of the participant B. That is, even in a case where speech of the participant B is collected by both the mobile terminal 2100 of the participant A and the mobile terminal 2100 of the participant B, the speech of the participant B is not transmitted from the mobile terminal 2100 of the participant A. Accordingly, similar pieces of text are not generated when the server device 2200 collates the text converted from the speech data.

FIG. 4A is referred to again. Next, in Step S4003, the specific phrase detecting unit 3003 detects a specific phrase in the text phrases. FIG. 8 illustrates a table in which specific phrases stored in the recording section 2203 and associated pieces of information concerning the position of a deletion candidate phrase are managed. The table may be stored in advance in the server device 2200 or may be a table that is constructed by registration of specific phrases and deletion candidate phrase position information by a user of the meeting minutes system.

When the specific phrase detecting unit 3003 detects, in the text phrases, a specific phrase included in the table of FIG. 8, the specific phrase detecting unit 3003 supplies the position of the specific phrase and deletion candidate phrase position information to the deleted phrase specifying unit 3004. In the example of FIGS. 7A through 7C, the specific phrase detecting unit 3003 detects a phrase "âriâ ofu-za-rekôdo (earlier off-the-record)" from among the speech data, and specifies "b", which is deletion candidate phrase position information associated with the phrase "âriâ ofu-za-rekôdo (earlier off-the-record)" by referring to the table of FIG. 8. Then, the specific phrase detecting unit 3003 supplies the position of the specific phrase "âriâ ofu-za-rekôdo (earlier off-the-record)" and the deletion candidate phrase position information "b" to the deleted phrase specifying unit 3004.

Upon receipt of the position of the specific phrase and the deletion candidate phrase position information from the specific phrase detecting unit 3003, the deleted phrase specifying unit 3004 specifies a deletion candidate character string on the basis of these pieces of information in Step S4004. In a case where deletion candidate phrase position information associated with a specific phrase supplied by the specific phrase detecting unit 3003 is "a", the deleted phrase specifying unit 3004 specifies, as a phrase to be deleted, a phrase that follows the specific phrase. Meanwhile, in a case where deletion candidate phrase position information associated with a specific phrase supplied by the specific phrase detecting unit 3003 is "b", the deleted phrase specifying unit 3004 specifies, as a phrase to be deleted, a phrase that is followed by the specific phrase.

In the example of FIGS. 7A through 7C, since the position of the specific phrase "âriâ ofu-za-rekôdo (earlier off-the-record)" and the deletion candidate phrase position information "b" are acquired by the specific phrase detecting unit 3003, the deleted phrase specifying unit 3004 specifies, as a phrase to be deleted, a phrase "za zyoinnto deberoppumento obu a supîchi rekogunisyonn sisutemu wizu Panasonic (the joint development of a speech recognition system with Panasonic)". Note that only a phrase immediately before (or immediately after) the specific phrase may be specified as a phrase to be deleted by the deleted phrase specifying unit 3004, but the phrase specified as a phrase to be deleted is not limited to this. It is also possible that how many phrases before or after a specific phrase are specified as a deletion target be set in advance by a user.

In Step S4004, the specified deletion candidate phrase (character string) may be assigned tag information and the specified deletion candidate phrase assigned the tag information may be managed.

After a deletion candidate character string is specified in Step S4004, the processing proceeds to Step S4005. In a case where no specific phrase is detected in Step S4003, the processing proceeds to Step S4005 without performing the processing in Step S4004.

Figure 9A:
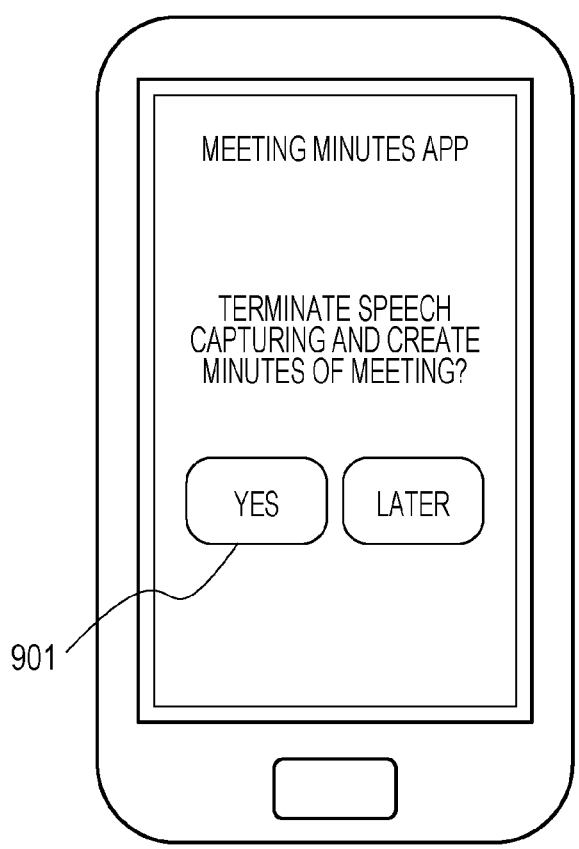
FIG. 9A is a diagram illustrating an example of display content displayed on a mobile terminal according to Embodiment 1.
Figure 9B:
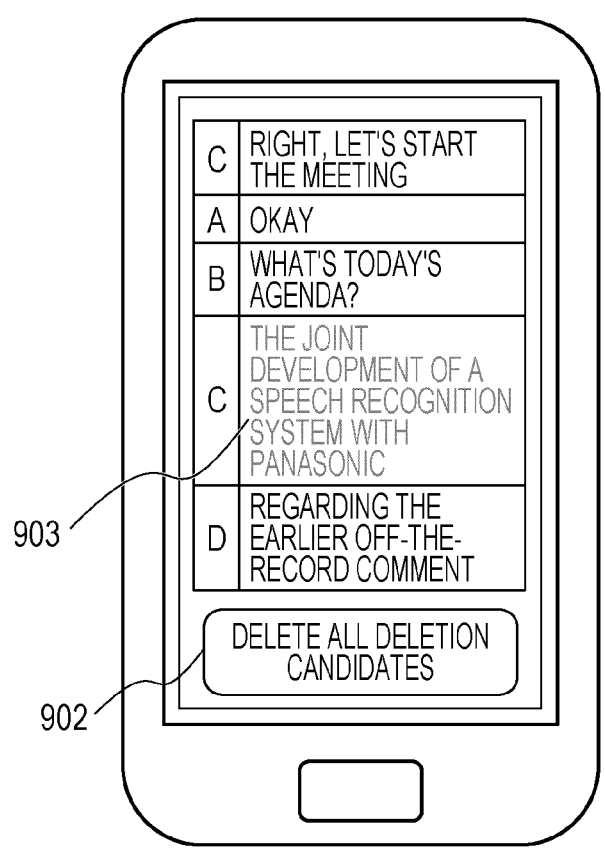
FIG. 9B is a diagram illustrating an example of display content displayed on a mobile terminal according to Embodiment 1.
Figure 9C:
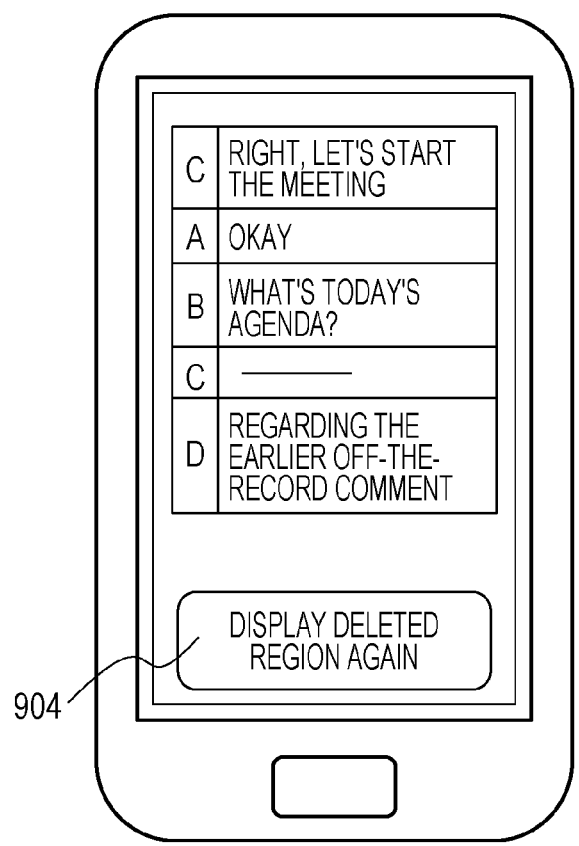
FIG. 9C is a diagram illustrating an example of display content displayed on a mobile terminal according to Embodiment 1.

In Step S4005, a display control unit 3005 creates a display command. The created display command is transmitted to the display section 2105 via the communication section 2201 and the communication section 2101 and is displayed on the display section 2105. FIGS. 9A through 9C illustrate examples of display content displayed on the display section 2105 of the mobile terminal 2100.

For example, in Step S4005, a display command to display an image illustrated in FIG. 9B is created. The display example illustrated in FIGS. 9A through 9C is described below.

First, after a user instructs termination of the meeting minutes system, a confirmation screen as illustrated in FIG. 9A is displayed. Note that a method for instructing termination of the meeting minutes system is not limited to in particular. In a case where the user selects a button 901 indicative of termination of creation of minutes of a meeting via the operation section 2106 of the mobile terminal 2100, the system finishes capturing of speech, and then the recorded text of the minutes of the meeting are displayed as illustrated in FIG. 9B in accordance with the display command acquired via the communication section 2101 by the mobile terminal 2100. That is, the operation section 2106 of the mobile terminal 2100 accepts user's selection of the button 901, and the control/processing section 2102 controls the display section 2105 to display the text of the minutes of the meeting.

In FIG. 9B, the recorded text of the minutes of the meeting are displayed together with information on speaking participants. Note that the display content of the text of the minutes of the meeting is not limited to this. A button 902 is displayed in FIG. 9B.

In FIG. 9B, the phrase specified as a deletion candidate in Step S4004 is displayed in a display form different from the other phrases. In FIG. 9B, for example, the phrase "the joint development of a speech recognition system with Panasonic" is displayed in a paler color than the other phrases. The display form of the phrase specified as a deletion candidate is not limited to this. For example, the phrase specified as a deletion candidate may be displayed in a color different from the other phrases. Alternatively, the phrase specified as a deletion candidate may be displayed at a luminance lower than that of the other phrases.

Thus, the user can delete the phrase specified as a deletion candidate in the created minutes of the meeting via the operation section 2106 of the mobile terminal 2100. In this example, when the user touches the button 902 "delete all deletion candidates" as illustrated in FIG. 9B, the instruction to delete the phrase specified as a deletion candidate is accepted. That is, the operation section 2106 of the mobile terminal 2100 accepts user's selection of the button 902, and the control/processing section 2102 controls the display section 2105 to delete the phrase specified as a deletion candidate. Thus, a display screen from which the phrase designated by the deletion instruction has been deleted is displayed as illustrated in FIG. 9C. An arrangement is also possible in which the user touches a display region 903 specified as a deletion candidate via the operation section 2106 of the mobile terminal 2100 and only the touched part is deleted.

In FIG. 9C, the text of the minutes of the meeting from which the specified phrase has been deleted and a button 904 are displayed. In FIG. 9C, the specified phrase is deleted, and instead a mark ("-" in FIG. 9C) indicating that the phrase has been deleted is displayed. However, the display content is not limited to this. It is also possible that nothing be displayed in the specified region. Although speaking participants' names are displayed in the example of FIG. 9C, the speaking participants' names may be deleted as well.

The user can display the deleted phrase again by touching the button 904. That is, the operation section 2106 of the mobile terminal 2100 accepts user's selection of the button 904, and the control/processing section 2102 controls the display section 2105 to display the phrase specified as a deletion candidate again.

FIG. 9B illustrates an example in which the phrase specified as a deletion candidate is displayed in a different display form, but the present embodiment is not limited to this. It is also possible that the phrase specified as a deletion candidate be not displayed from the start and only the other phrases be displayed. In this case, it is possible to employ an arrangement in which the phrase specified as a deletion candidate is displayed when the user touches a specific button display region.

Figure 4B:
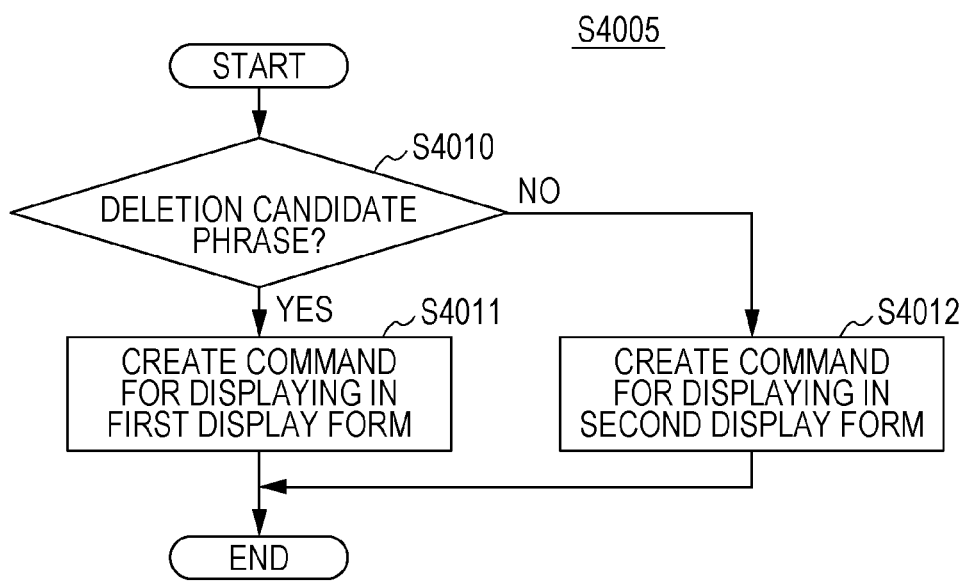
FIG. 4B is a flow chart illustrating an example of processing for creating a display command illustrated in FIG. 4A.

In this way, in Step S4005, the control/processing section 2202 of the server device 2200 creates a display command instructing the mobile terminal 2100 to display an image as illustrated in FIG. 9B. FIG. 4B is a flow chart illustrating an example of the processing (creation of a display command) in Step S4005.

In Step S4010, the display control unit 3005 determines whether or not a phrase (character string) for which a display command is created is a deletion candidate phrase. In a case where a phrase (character string) specified as a deletion candidate is assigned tag information in S4004, whether or not the phrase (character string) for which a display command is created is a deletion candidate phrase can be determined by determining whether or not there is tag information.

In a case where it is determined in Step S4010 that the phrase (character string) for which a display command is created is a deletion candidate phrase, the processing proceeds to Step S4011. In Step S4011, a command to display the phrase in a first display form is created.

Meanwhile, in a case where it is determined in Step S4010 that the phrase (character string) for which a display command is created is not a deletion candidate phrase, the processing proceeds to Step S4012. In Step S4012, a command to display the phrase in a second display form different from the first display form is created.

According to the system for creating minutes of a meeting according to the present embodiment, captured speech is converted into text once, and then a deletion candidate phrase (character string) is specified by detecting a specific phrase in the text phrases. With this arrangement, even after a speaking participant utters phrases, deletion target characters can be specified by going back to the phrases uttered in the past. Furthermore, since captured speech is converted into text once, it is easy to edit minutes of a meeting, for example, it is possible to display a deleted phrase again even in a case where a deletion candidate phrase region specified by a user and a deletion candidate phrase region recognized by the system are different (FIG. 9C).

In a conventional meeting minutes system, speech capturing or speech recognition and conversion into text is stopped in a case where a specific phrase is detected.

Therefore, a past utterance cannot be specified as a deletion candidate unlike the present disclosure. Furthermore, in the present embodiment, a deletion candidate character string and a character string which is not a deletion candidate are displayed in different display forms. According to a conventional art, it is impossible to check a deletion candidate phrase itself and to display a phrase again after the phrase is specified as a deletion candidate.

A character string specified as a deletion candidate in Step S4004 is not limited to a character string immediately before or immediately after a specific phrase. A deletion candidate character string may be specified by uttering a plurality of specific phrases. For example, in a case where the specific phrase detecting unit 3003 detects speech "delīsyon obu Panasonic (deletion of Panasonic)", the deleted phrase specifying unit 3004 may specify, as a deletion target phrase, all of the phrases "Panasonic" or all of the phrases including the phrase "Panasonic" among phrases that have been already converted into text (and/or phrases that will be converted into text thereafter). In this case, the specific phrase detecting unit 3003 detects the phrase "delīsyon (deletion)" as a first specific phrase indicative of a deletion instruction, detects the phrase "obu (of)" immediately after the first specific phrase as a second specific phrase for designating a deletion target, and detects "Panasonic" immediately after the second specific phrase as a third specific phrase. In this way, it is possible to distinguish processing performed in a case where a specific phrase "delīsyon obu disu (deletion of this)" illustrated in FIG. 8 is detected and processing performed in a case where the specific phrase "delīsyon obu Panasonic (deletion of Panasonic)" is detected.

Embodiment 2

Overview of System

A system configuration similar to that of FIG. 1 can also be employed in a system for creating minutes of a meeting according to the present embodiment. Therefore, detailed description of the overview of the system is omitted. Note that the following mainly discusses a case where the system of FIG. 1A is employed.

Configuration of Each Device

Elements in the system for creating minutes of a meeting according to Embodiment 2 are described with reference to FIG. 10. The system for creating minutes of a meeting according to the present embodiment includes a mobile terminal 1010 and a server device 2200. Since the server device 2200 has a configuration similar to that in Embodiment 1, elements of the server device 2200 are given similar reference symbols and are not described in detail. With regard to the mobile terminal 1010, elements different from those of the mobile terminal 2100 described in Embodiment 1 are mainly described. The server device 2200 may include one or more of the elements/units of the mobile terminal 1010 illustrated in FIG. 10, and the mobile terminal 1010 may include one or more of the elements/units of the server device 2200.

The mobile terminal 1010 includes a communication section 2101, a control/processing section 2102, a recording section 2103, a speech capturing section 2104, a display section 2105, an operation section 2106, a speech reproducing section 2107, a proximity detecting section 2108, and an inclination detecting section 2109. The speech reproducing section 2107 and the inclination detecting section 2109 are not essential elements. The mobile terminal 1010 is different from the mobile terminal 2100 described in Embodiment 1 in that the mobile terminal 1010 includes the proximity detecting section 2108 and the inclination detecting section 2109. The proximity detecting section 2108 and the inclination detecting section 2109 are described below.

The proximity detecting section 2108 detects the presence or absence of an object that is close to the mobile terminal 1010. The proximity detecting section 2108 is a so-called proximity sensor and detects whether or not a target object is within a certain distance, without making contact with the object, from proximity detecting section 2108. There are various types (e.g., induction-type, capacitance-type, ultrasonic-type, electromagnetic-wave-type, infrared-type) of proximity sensors that detect a change of energy such as a magnetic field, an electromagnetic wave, light, or a sound wave. Any of these types of proximity sensors may be employed as the proximity detecting section 2108. A predetermined distance within which the presence or absence of an object is detected by the proximity detecting section 2108 is not limited in particular. In the present embodiment, it is assumed that the presence or absence of an object within a relatively short distance, such as a distance ranging from 0 cm (centimeter) to 2 cm, from the proximity detecting section 2108 is detected.

Figure 11:
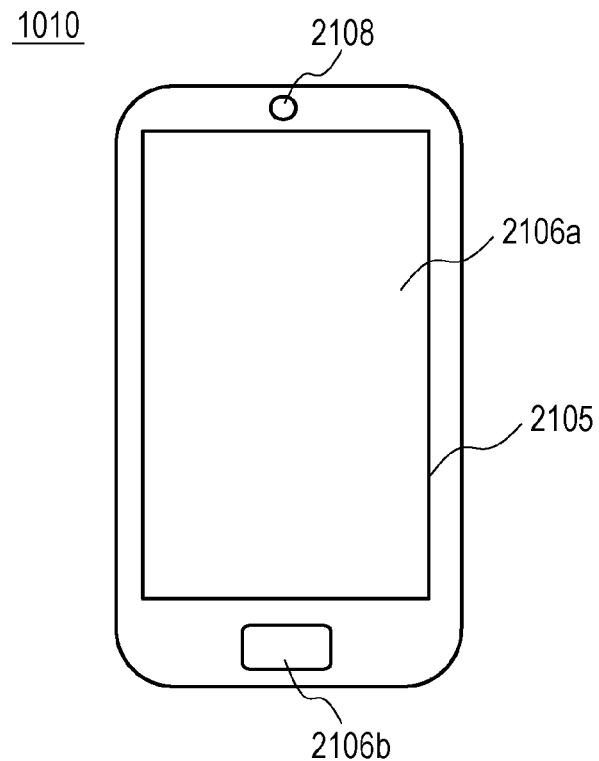
FIG. 11 is a diagram illustrating an example of a terminal device of the present system according to Embodiment 2.

FIG. 11 illustrates an overview of the mobile terminal 1010 including the proximity detecting section 2108. As illustrated in FIG. 11, the mobile terminal 1010 includes an operation section 2106a, an operation section 2106b, and the proximity detecting section 2108. The operation section 2106a is a so-called touch panel and can accepts a user's touch operation. The operation section 2106b is a button and is mainly used to terminate an application that is being activated in the mobile terminal 1010 or to display a standby screen without terminating an application that is being activated. The standby screen is a top screen displayed upon power activation of the mobile terminal 1010 and accepts activation of all kinds of applications. For example, a screen including a background image of a single color (e.g., blue or black) is displayed as the top screen.

The background image included in the top screen is not limited to a background image of a single color. The background image may include a photograph image (not illustrated) or a graphics image (not illustrated). Alternatively, the top screen may include an icon image (not illustrated).

As illustrated in FIG. 11, the proximity detecting section 2108 is disposed at a position opposite to the operation section 2106b across the operation section 2106a. Note that the proximity detecting section 2108 may be disposed at a position other than the position illustrated in FIG. 11. For example, the proximity detecting section 2108 may be disposed in the vicinity of the operation section 2106b.

The inclination detecting section 2109 detects an inclination (angle) of the mobile terminal 1010. The inclination detecting section 2109 is not limited to a specific one, provided that the inclination detecting section 2109 can detect an inclination of the mobile terminal 1010 itself. An inertial sensor (angular velocity sensor) or the like can be employed as the inclination detecting section 2109.

Figure 10:
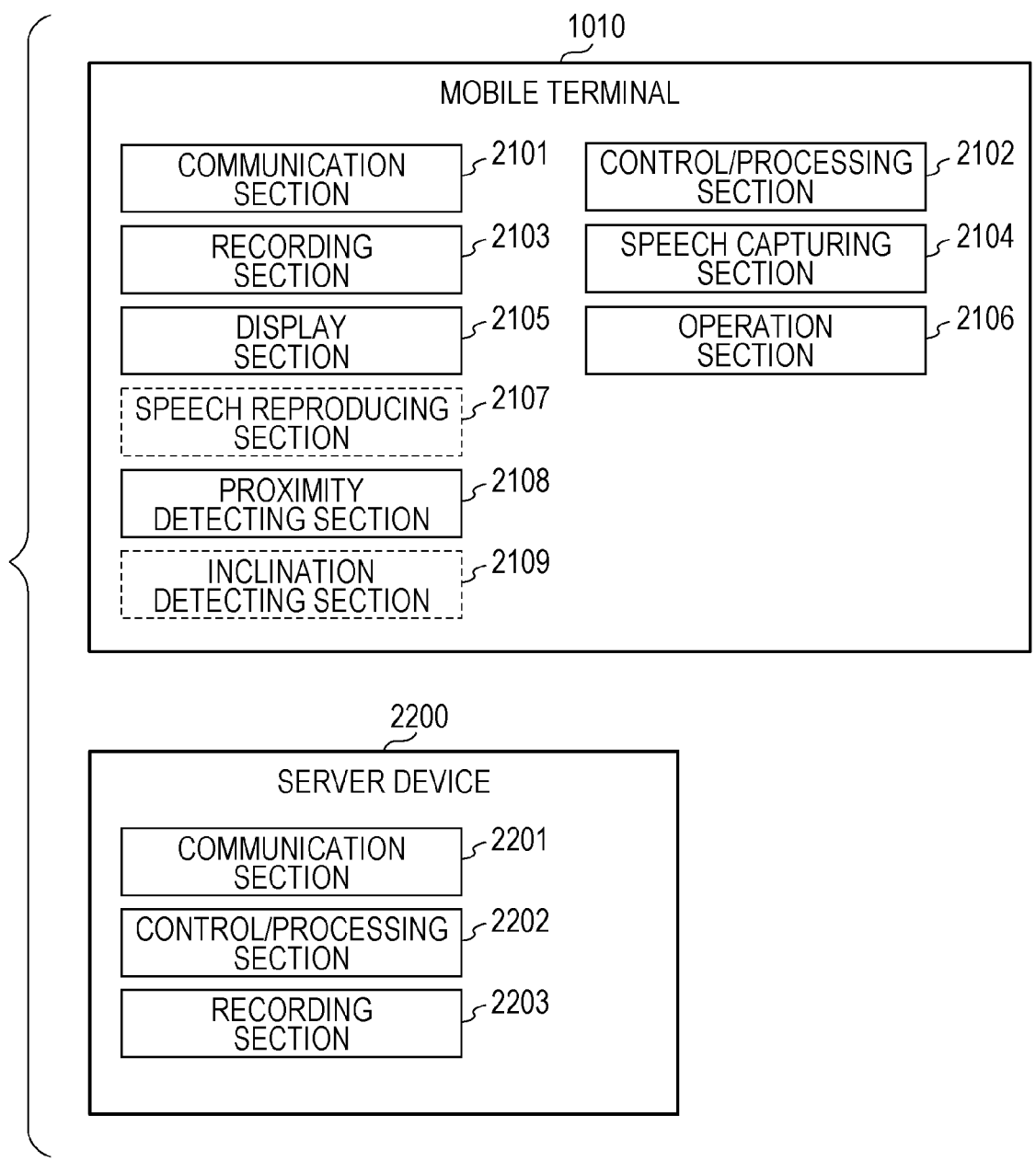
FIG. 10 is a diagram illustrating an example of a configuration of each device of the present system according to Embodiment 2.

The elements different from Embodiment 1 have been described above, but the mobile terminal 2100 and the server device 2200 need not necessarily to include all of the elements described in FIG. 10. One or more of the elements may be omitted.

Functional Elements of Control/Processing Section

Figure 12:
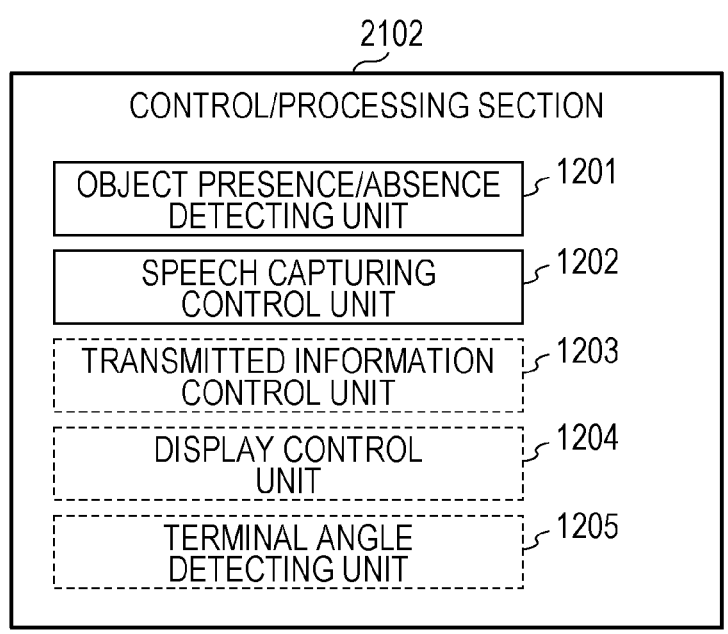
FIG. 12 is a diagram illustrating an example of a configuration of control/processing section in a terminal of the present system according to Embodiment 2.

FIG. 12 illustrates a configuration of the control/processing section 2102 of the mobile terminal 1010 in the present embodiment.

The control/processing section 2102 of the mobile terminal 1010 includes an object presence/absence detecting unit 1201, a speech capturing control unit 1202, a transmitted information control unit 1203, a display control unit 1204 and a terminal angle detecting unit 1205.

The control/processing section 2202 of the server device 2200 includes a speech data acquiring unit 3001, a speech recognition/text collating unit 3002, and a display control unit 3005. Note that the functional elements of the control/processing section 2202 have functions similar to the elements described in Embodiment 1 with reference to FIG. 3.

The functional elements are described below with reference to the sequence diagram of FIG. 13. The processing steps S1301 through S1317 performed by the elements are described below. Note that some of these step may be shuffled.

First, in Step S1301, the speech capturing section 2104 of the mobile terminal 1010 captures speech in a meeting. Note that it is assumed that, at a stage (not illustrated) previous to Step S1301, the speech capturing control unit 1202 of the control/processing section 2102 already instructs the speech capturing section 2104 to capture speech.

Then, in Step S1302, the speech capturing section 2104 supplies the captured speech data to the communication section 2101. In Step S1302, the speech capturing section 2104 directly supplies the captured speech data to the communication section 2101, but the captured speech data may be stored in a temporary memory (not illustrated) before the captured speech data is supplied to the communication section 2101.

In Step S1303, the communication section 2101 transmits the speech data to the communication section 2201 via the Internet. The communication section 2101 may convert/compress the data in order to transmit the speech data although this processing is not illustrated. A timing at which the communication section 2101 transmits the speech data to the communication section 2201 is not limited in particular. The communication section 2101 may transmit the speech data every predetermined time or may transmit the speech data every time a predetermined amount of data is accumulated.

Then, in Step S1304, the communication section 2201 supplies the captured speech data to the control/processing section 2202. The control/processing section 2202 causes the speech data acquiring unit 3001 to acquire the speech data.

In Step S1305, the speech recognition/text collating unit 3002 of the control/processing section 2202 converts the acquired speech data into text through speech recognition. Furthermore, the speech recognition/text collating unit 3002 collates the text converted from the speech data. Then, in Step S1306, the display control unit 3005 of the control/processing section 2202 generates a display command.

Next, processing performed in Step S1307 and the subsequent steps when the proximity detecting section 2108 of the mobile terminal 1010 detects proximity of an object is described. Note that the processing in Step S1307 and the subsequent steps is not necessarily performed after Steps S1301 through S1306.

In a case where the proximity detecting section 2108 of the mobile terminal 1010 detects proximity of an object, the object presence/absence detecting unit 1201 of the control/processing section 2102 acquires (detects) information indicating "presence" of an object in Step S1307. For example, a situation is possible in which the proximity detecting section 2108 detects proximity of an object because a speaking participant who utters phrases which the speaking participant does not want to record as minutes of a meeting does an action such as intentionally covering the proximity detecting section 2108 with a hand.

Then, in Step S1308, the speech capturing control unit 1202 supplies, to the speech capturing section 2104, a control signal for instructing the speech capturing section 2104 to stop capturing of the speech.

Then, in Step S1309, upon receipt of the control signal for instructing the speech capturing section 2104 to stop capturing of the speech, the speech capturing section 2104 stops capturing of speech. During stoppage of the speech, no speech data is supplied to the communication section 2101 (there is no supplied speech data), and therefore no speech data is transmitted to the server device 2200.

Then, in a case where the proximity detecting section 2108 of the mobile terminal 1010 ceases to detect proximity of an object, the object presence/absence detecting unit 1201 of the control/processing section 2102 acquires (detects) information indicating "absence" of an object in Step S1310.

Then, in Step S1311, the speech capturing control unit 1202 supplies, to the speech capturing section 2104, a control signal instructing the speech capturing section 2104 to start (resume) capturing of speech.

Then, in Step S1312, upon receipt of the control signal instructing the speech capturing section 2104 to start (resume) capturing of speech, the speech capturing section 2104 starts (resumes) capturing of speech. Furthermore, in Step S1313, the speech capturing section 2104 supplies the captured speech data to the communication section 2101.

The processing in the subsequent steps S1314 through S1317 is similar to that in Steps S1304 through Step S1306 and therefore description thereof is not repeated.

As described above, the speech capturing section 2104 stops capturing of speech while the proximity detecting section 2108 of the mobile terminal 1010 is detecting proximity of an object. This allows meeting participants to easily perform an operation for prohibiting recording of phrases which the meeting participants do not want to record in minutes of a meeting. Use of the method of the present embodiment in a system in which meeting participants use their own terminals (e.g., smartphones) to capture their speech makes it possible to easily create minutes of a meeting excluding unnecessary parts (or recording only necessary parts).

The method described in Japanese Unexamined Patent Application Publication No. 2006-238275 is a method in which a special switch is pressed and therefore requires a special device. Furthermore, in the system in which meeting participants use their own terminals (smartphones) to capture speech to create minutes of a meeting as in the present embodiment, the method of Japanese Unexamined Patent Application Publication No. 2006-238275 cannot be employed for the following reason.

A touch panel input type terminal such as a smartphone has few physical buttons (switches). A smartphone is often configured such that when one of the few physical buttons is pressed, the screen returns to a home screen (standby screen). It is unlikely that this button is used as a switch for turning off speech recording in a state in which a dedicated application is being activated. It is possible that a virtual switch having a function of turning off speech recording be disposed in a certain display region of a touch panel, but touching the small button region in a small screen such as a smartphone during a meeting, especially during utterance can lead to hindrance of the meeting. Since a user cannot feel whether or not the user pressed a correct position of a touch panel, the user is forced to touch the correct position by looking at the screen. This blocks user's vision and ruins user's concentration on the meeting and utterance, thereby hindering the smooth progress of the meeting.

In this respect, according to the method of the present embodiment, in which a proximity sensor (the proximity detecting section 2108) is used, a user can switch on and off speech recording just by putting a hand over the terminal. It is therefore possible to record only necessary parts as minutes of a meeting without hindering user's utterance and the progress of the meeting.

Furthermore, since speech capturing by the speech capturing section 2104 can be stopped just by an action of putting a hand over the mobile terminal 1010, a user can intuitively understand an operation for stopping speech capturing. It is therefore possible to provide a user-friendly user interface.

In the present embodiment, speech capturing is stopped in a case where the proximity detecting section 2108 detects proximity of an object, and speech capturing is performed in a case where the proximity detecting section 2108 does not detect proximity of an object. However, this processing may be performed in an opposite manner. Specifically, speech capturing is performed in a case where the proximity detecting section 2108 detects proximity of an object, and speech capturing is stopped in a case where the proximity detecting section 2108 does not detect proximity of an object. This makes it possible to more strictly restrict phrases recorded as minutes of a meeting. It is therefore easier to record only importance utterances in a meeting as minutes of a meeting. A user may select (set) in advance whether or not speech capturing is stopped upon detection of proximity of an object. This makes it possible to create minutes of a meeting by a method appropriate for a meeting.

Next, the first modification of the present embodiment is described with reference to the sequence diagram of FIG. 14.

Steps S1301 through S1306 are similar to those described with reference to FIG. 13 and therefore description thereof is not repeated.

When the proximity detecting section 2108 of the mobile terminal 1010 detects proximity of an object, the object presence/absence detecting unit 1201 of the control/processing section 2102 acquires (detects) information indicating "presence" of an object in Step S1407. For example, a situation is possible in which the proximity detecting section 2108 detects proximity of an object because a speaking participant who utters phrases which the speaking participant does not want to record as minutes of a meeting during a meeting does an action such as intentionally covering the proximity detecting section 2108 with a hand.

Then, in Step S1408, the transmitted information control unit 1203 supplies, to the communication section 2101, a control signal instructing the communication section 2101 to stop transmission of speech data (to the server device 2200).

Therefore, upon receipt of the control signal, the communication section 2101 continues to receive speech from the speech capturing section 2104, but this speech data is not transmitted by the communication section 2101.

Then, in a case where the proximity detecting section 2108 of the mobile terminal 1010 ceases to detect proximity of an object, the object presence/absence detecting unit 1201 of the control/processing section 2102 acquires (detects) information indicating "absence" of an object in Step S1409. Then, in Step S1410, the speech capturing control unit 1202 supplies, to the communication section 2101, a control signal instructing the communication section 2101 to start (resume) transmission of speech data (to the server device 2200).

The subsequent steps S1411 through S1414 are similar to Steps S1303 through S1306 and therefore description thereof is not repeated.

Figure 14:
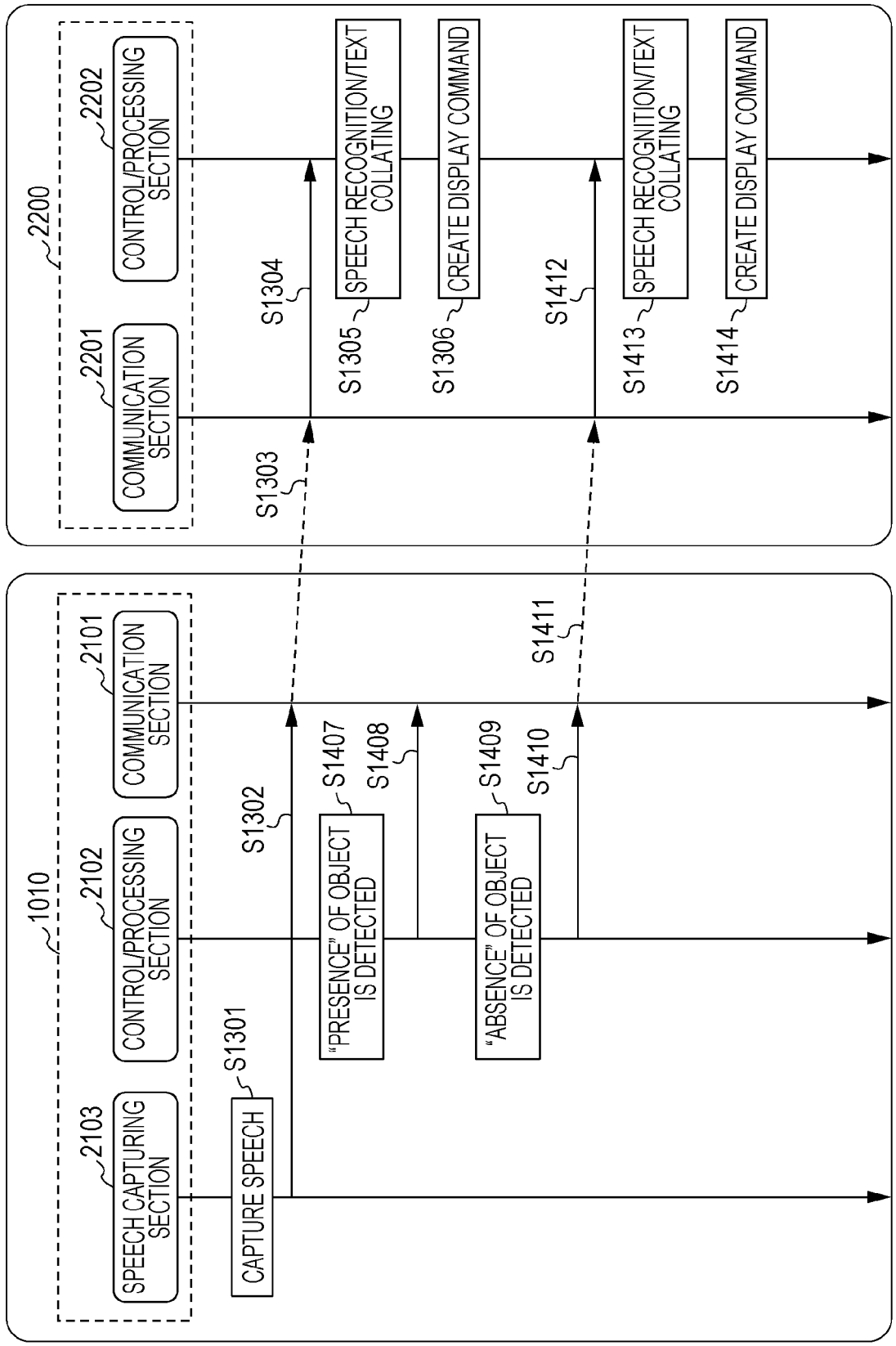
FIG. 14 is a sequence diagram illustrating an example of processing of the present system according to Embodiment 2.

According to the first modification of the present embodiment illustrated in FIG. 14, the communication section 2101 does not transmit speech data to the server device 2200 while the proximity detecting section 2108 is detecting proximity of an object. This allows a meeting participant to easily perform an operation for preventing recording of phrases which the meeting participant does not want to record as minutes of a meeting.

According to the present modification, the speech capturing section 2104 continues capturing of speech even while the proximity detecting section 2108 is detecting proximity of an object. The captured speech may be recorded, for example, in the recording section 2103 of the mobile terminal 1010. That is, phrases uttered while the proximity detecting section 2108 is detecting proximity of an object are not recorded as minutes of a meeting but are recorded as speech data in the mobile terminal 1010. This allows a participant in possession of the mobile terminal 1010 to check utterances that are not recorded as minutes of a meeting after a meeting. An arrangement is possible in which utterances that are recorded in the mobile terminal 1010 but are not recorded as minutes of a meeting are transmitted to the server device 2200 to create minutes of a meeting again.

Next, the second modification of the present embodiment is described with reference to FIGS. 15 and 16.

Figure 15:
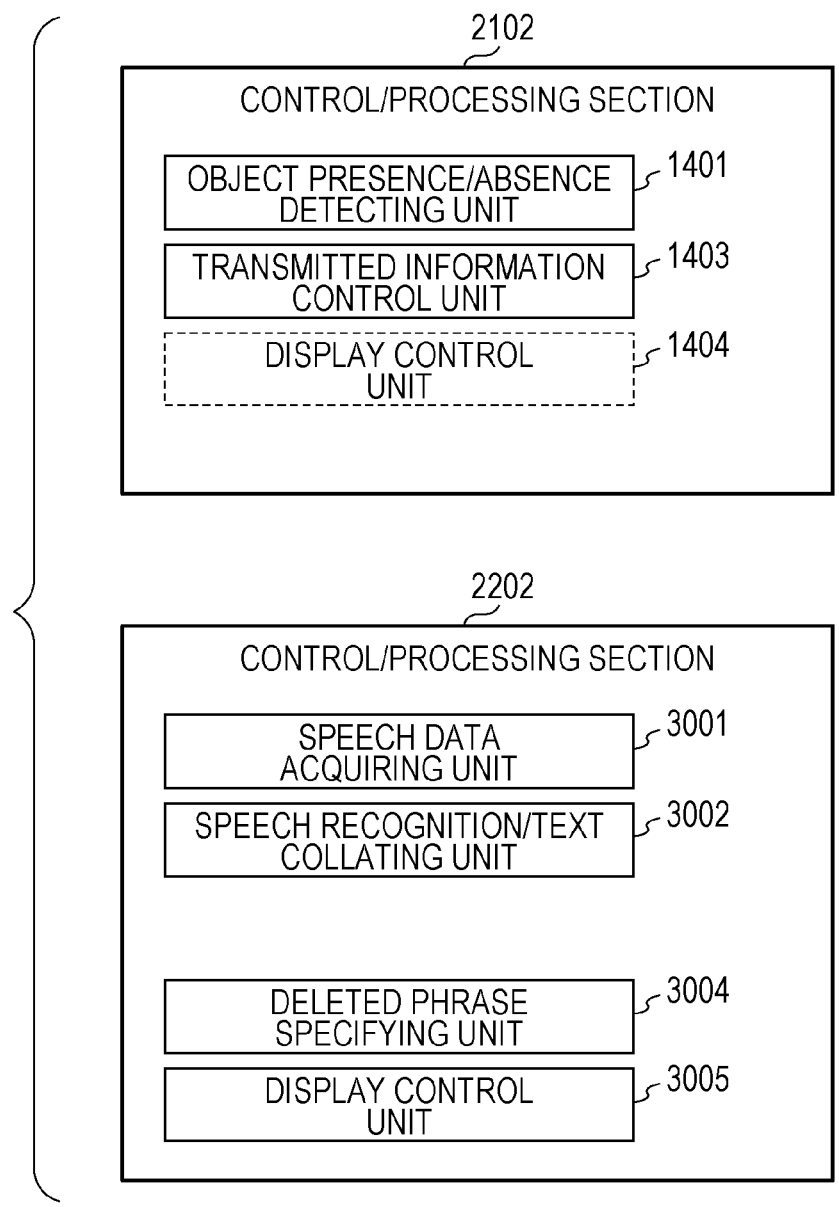
FIG. 15 is a diagram illustrating an example of a configuration of each device of the present system according to Embodiment 2.
Figure 16:
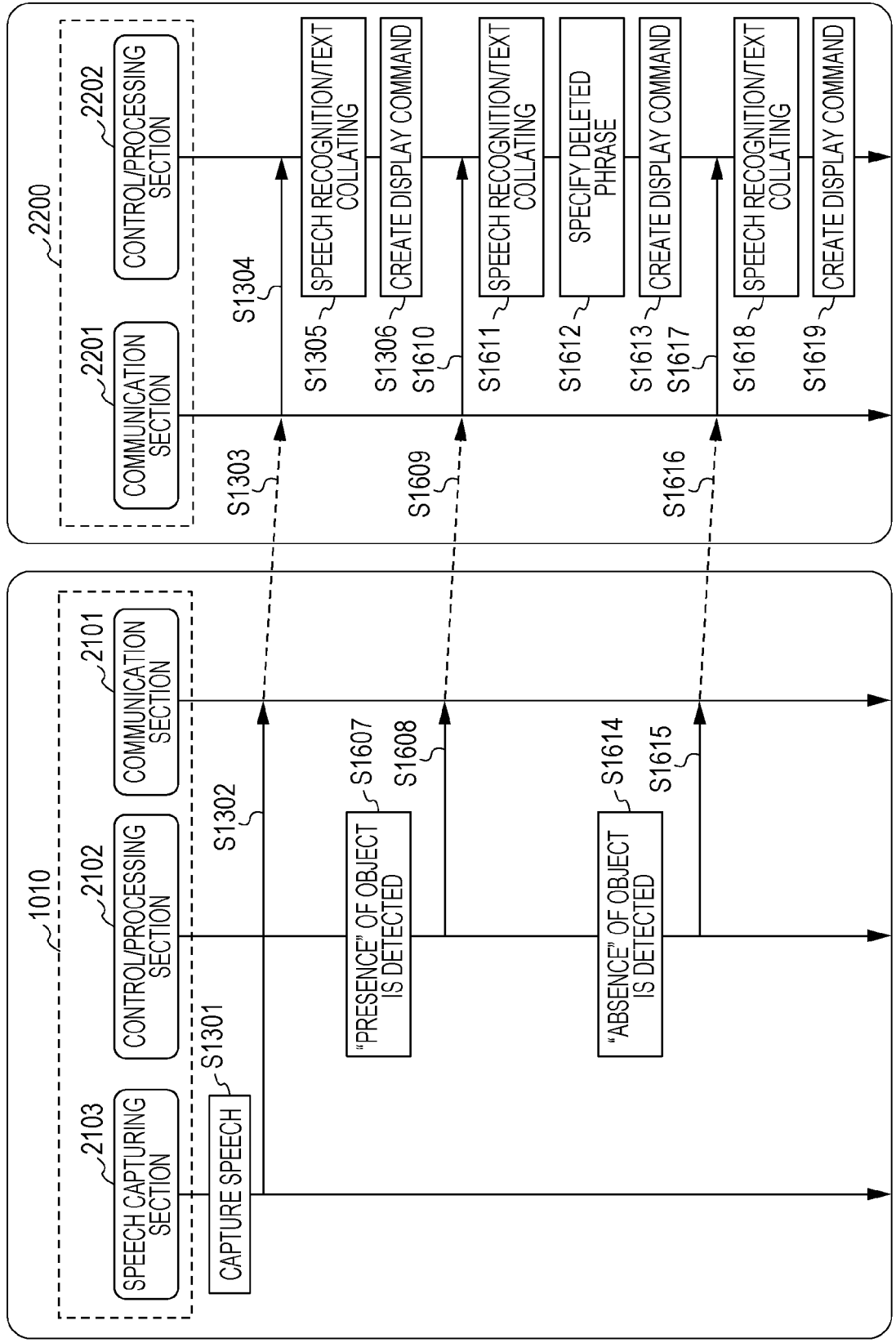
FIG. 16 is a sequence diagram illustrating an example of processing of the present system according to Embodiment 2.

FIG. 15 illustrates an example of functional elements of the control/processing section 2102 of the mobile terminal 1010 and the control/processing section 2202 of the server device 2200 according to the second modification.

The control/processing section 2102 of the mobile terminal 1010 includes an object presence/absence detecting unit 1401, a transmitted information control unit 1403, and a display control unit 1404.

The control/processing section 2202 of the server device 2200 includes a speech data acquiring unit 3001, a speech recognition/text collating unit 3002, a deleted phrase specifying unit 3004, and a display control unit 3005. Note that the functional elements of the control/processing section 2202 have functions similar to those described in Embodiment 1 with reference to FIG. 3.

The functional elements are described below with reference to the sequence diagram of FIG. 16.

Figure 13:
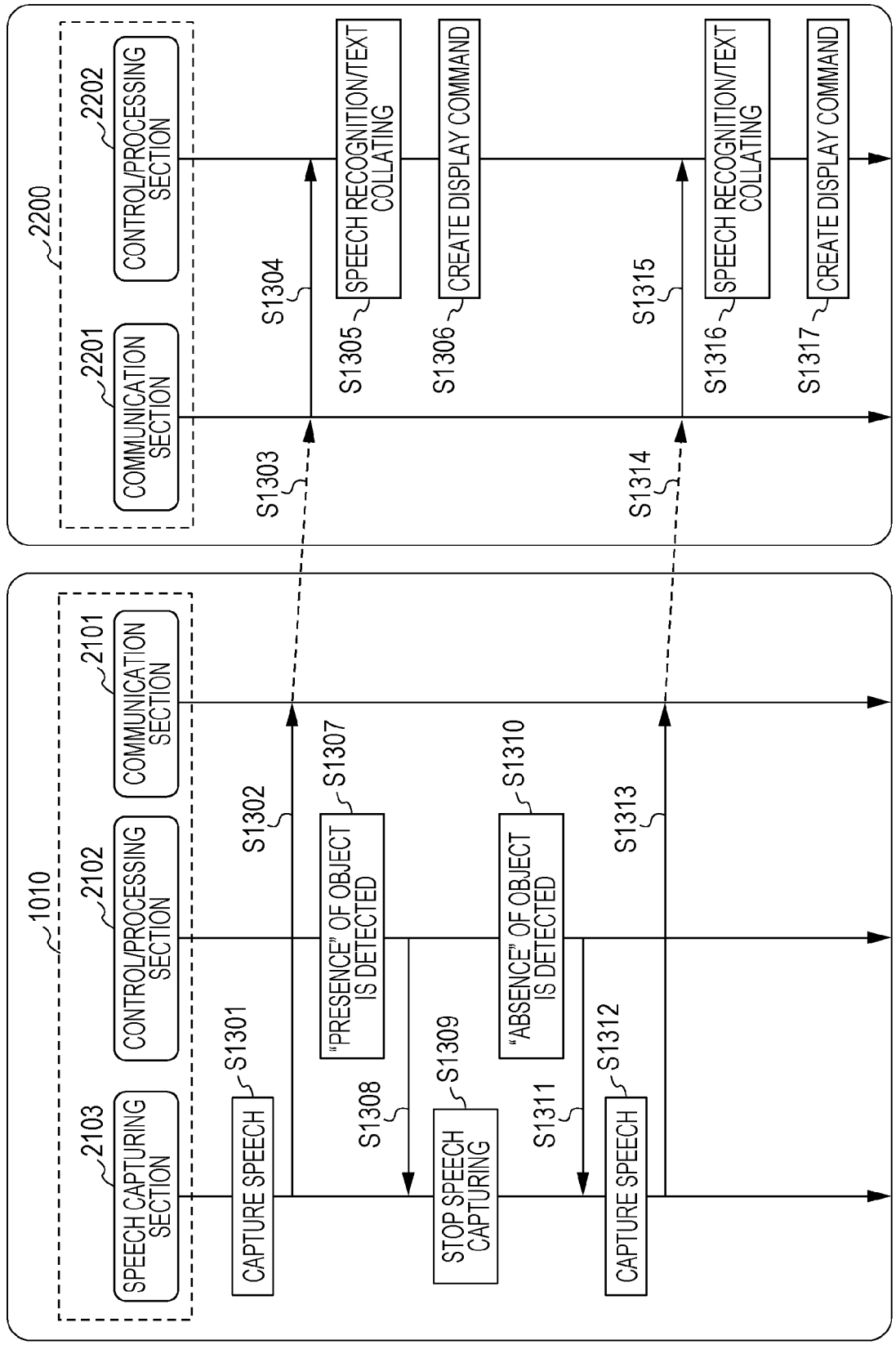
FIG. 13 is a sequence diagram illustrating an example of processing of the present system according to Embodiment 2.

Processing in Steps S1301 through Step S1306 is similar to that in FIG. 13 and therefore description thereof is not repeated.

When the proximity detecting section 2108 of the mobile terminal 1010 detects proximity of an object, the object presence/absence detecting unit 1401 of the control/processing section 2102 acquires (detects) information indicating "presence" of an object in Step S1607. For example, a situation is possible in which the proximity detecting section 2108 detects proximity of an object because a speaking participant who utters phrases which the speaking participant does not want to record as minutes of a meeting during a meeting does an action such as intentionally covering the proximity detecting section 2108 with a hand. Then, in Step S1608, the information indicating "presence" of the object is supplied from the control/processing section 2102 to the communication section 2101.

Then, in Step S1609, the transmitted information control unit 1403 transmits speech data captured by the speech capturing section 2104 and the information indicating "presence" of the object to the communication section 2201 of the server device 2200.

Upon receipt of the speech data and the information indicating "presence" of the object, the communication section 2201 of the server device 2200 supplies the speech data and the information indicating "presence" of the object to the control/processing section 2202 in Step S1610.

The control/processing section 2202 causes the speech data acquiring unit 3001 to acquire the speech data and the information indicating "presence" of the object from the communication section 2201 and causes the speech recognition/text collating unit 3002 to perform speech recognition and conversion into text with respect to the acquired speech in Step S1611.

Then, in Step S1612, the deleted phrase specifying unit 3004 assigns tag information indicative of a deletion candidate phrase to the text phrase obtained in Step S1611. The deleted phrase specifying unit 3004 may perform processing for specifying a text of speech captured during detection of "presence" of an object by using time information.

Then, in Step S1613, the display control unit 3005 of the control/processing section 2202 generates a display command. Specifically, the display control unit 3005 creates a display command to display, in different display forms, the phrase that is assigned tag information indicative of a deletion candidate phrase and a phrase that is not assigned tag information indicative of a deletion candidate phrase by the deleted phrase specifying unit 3004 in Step S1612.

The control/processing section 2202 may control the elements not to perform any of or all of the speech recognition/text collating processing (S1611), the deleted phrase specifying processing (S1612), and the display command creating processing (S1613) upon receipt of the speech data and the information indicating "presence" of the object in Step S1609. In this case, a display command is not created for speech data captured during detection of "presence" of an object in Step S1607.

Next, in a case where the proximity detecting section 2108 of the mobile terminal 1010 ceases to detect proximity of an object, the object presence/absence detecting unit 1401 of the control/processing section 2102 acquires (detects) information indicating "absence" of an object in Step S1614. Then, in Step S1615, the information indicating "absence" of an object is supplied from the control/processing section 2102 to the communication section 2101.

Then, in Step S1615, the transmitted information control unit 1403 of the control/processing section 2102 transmits speech data captured by the speech capturing section 2104 and the information indicating "absence" of an object to the communication section 2201 of the server device 2200.

Upon receipt of the speech data and the information indicating "absence" of an object, the communication section 2201 of the server device 2200 supplies the speech data and the information indicating "absence" of an object to the control/processing section 2202 in Step S1617.

The control/processing section 2202 causes the speech data acquiring unit 3001 to acquire the speech data and the information indicating "absence" of an object from the communication section 2201 and causes the speech recognition/text collating unit 3002 to perform speech recognition and conversion into text with respect to acquired speech in Step S1618.

Since the control/processing section 2202 acquires the information indicating "absence" of an object, the deleted phrase specifying unit 3004 of the control/processing section 2202 does not perform the processing for assigning tag information indicative of a deletion candidate phrase, and the processing proceeds to Step S1619. In Step S1619, the display control unit 3005 of the control/processing section 2202 creates a display command.

The display command created in the second modification makes it possible to generate the display screen described in Embodiment 1 with reference to FIGS. 9A through 9C. Since a deletion candidate phrase is stored in the server device 2200, the deletion candidate phrase can be displayed in a display form different from other phrases. That is, in the present modification, it is possible to produce effects similar to those described in Embodiment 1 in addition to the effects described in Embodiment 2.

Figure 17:
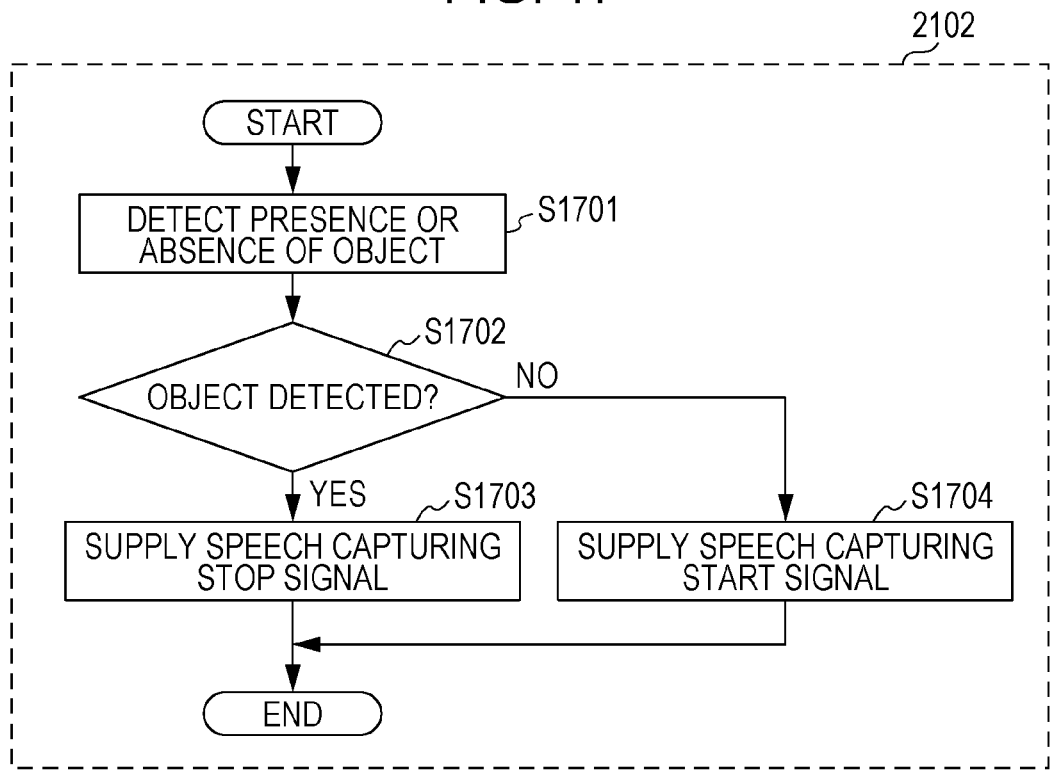
FIG. 17 is a flow chart illustrating an example of processing of a control/processing section of a mobile terminal according to Embodiment 2.

Processing of the control/processing section 2102 of the mobile terminal 1010 in Embodiment 2 is described below with reference to the flow chart of FIG. 17. Processing of the control/processing section 2102 of the mobile terminal 1010 in the first modification of Embodiment 2 is described below with reference to the flow chart of FIG. 18. Processing of the control/processing section 2202 of the server device 2200 in the second modification of Embodiment 2 is described below with reference to the flow chart of FIG. 19. Processing of the control/processing section 2102 of the mobile terminal 1010 in the third modification and the fourth modification of Embodiment 2 that are not described in FIGS. 13, 14, and 16 is described below with reference to the flow charts of FIGS. 20 and 22.

Processing of Control/Processing Section 2102 of Embodiment 2

Processing of the control/processing section 2102 of Embodiment 2 is described below with reference to FIG. 17.

In Step S1701, the object presence/absence detecting unit 1201 detects presence or absence of an object.

In Step S1702, the speech capturing control unit 1202 determines "presence" or "absence" of an object detected in Step S1701. In a case of "presence" of an object, the speech capturing control unit 1202 supplies a speech capturing stop signal to the speech capturing section 2104 in Step S1703.

Meanwhile, in a case where "absence" of an object is determined in Step S1702, the speech capturing control unit 1202 supplies a speech capturing start signal to the speech capturing section 2104 in Step S1704.

The speech capturing start signal and the speech capturing stop signal may be supplied only when the state of detection of an object changes. This processing in the control/processing section 2102 may be performed by the control/processing section 2202. That is, the server device 2200 may transmit a signal indicating whether or not to stop speech capturing based on presence or absence of an object to the mobile terminal 1010.

Processing of Control/Processing Section 2102 in First Modification of Embodiment 2

Processing of the control/processing section 2102 in the first modification of Embodiment 2 is described below with reference to FIG. 18.

Processing in Steps S1701 through Step S1702 is similar to that described with reference to FIG. 17 and therefore description thereof is not repeated.

In Step S1702, the speech capturing control unit 1202 determines "presence" or "absence" of an object detected in Step S1701. In a case of "presence" of an object, the speech capturing control unit 1202 supplies a speech data transmission stop signal to the communication section 2101 in Step S1703.

Meanwhile, in a case where "absence" of an object is determined in Step S1702, the speech capturing control unit 1202 supplies a speech data transmission start signal to the communication section 2101 in Step S1704.

The speech data transmission start signal and the speech data transmission stop signal may be supplied only when the state of detection of an object changes. This processing in the control/processing section 2102 may be performed by the control/processing section 2202. That is, the server device 2200 may transmit a signal indicating whether or not to transmit a speech signal based on presence or absence of an object to the mobile terminal 1010.

Processing of Control/Processing Section 2202 in Second Modification of Embodiment 2

Figure 19:
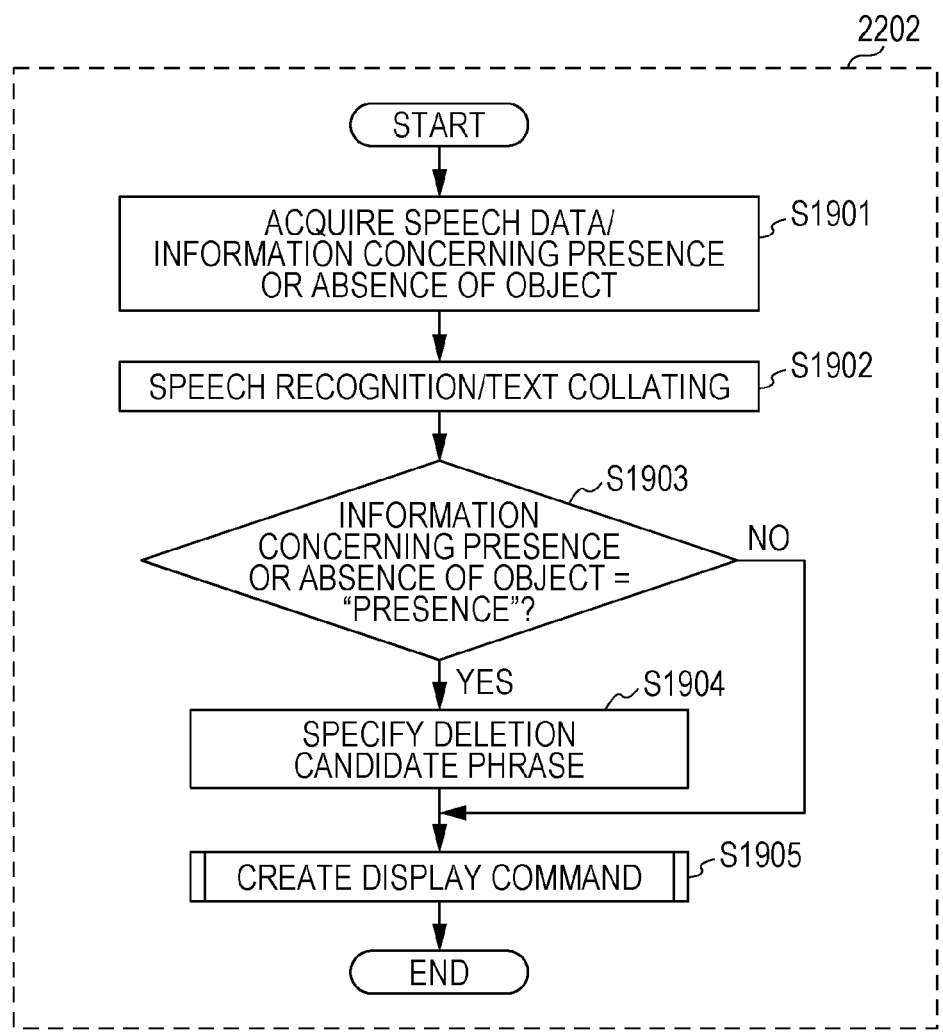
FIG. 19 is a flow chart illustrating an example of processing of a control/processing section of a server device according to the second modification of Embodiment 2.

Processing of the control/processing section 2202 in the second modification of Embodiment 2 is described below with reference to FIG. 19.

In Step S1901, the speech data acquiring unit 3001 acquires speech data and information concerning presence or absence of an object.

In Step S1902, the speech recognition/text collating unit 3002 performs speech recognition and text collating processing. This processing is identical to that in Step S4003 illustrated in FIG. 4A.

In Step S1903, the deleted phrase specifying unit 3004 determines whether or not the information concerning the presence or absence of an object indicates "presence". In a case where the information concerning the presence or absence of an object indicates "presence", the processing proceeds to Step S1904. In Step S1904, a deletion candidate phrase (character string) is specified. After the deletion candidate phrase is specified, the processing proceeds to Step S1905.

Meanwhile, in a case where the deleted phrase specifying unit 3004 determines that the information concerning the presence or absence of an object indicates "absence" in Step S1903, the processing proceeds to Step S1905.

In Step S1905, the display control unit 3005 creates a display command. Specifically, the display control unit 3005 creates a display command to display a phrase (character string) specified as a deletion candidate and other phrases in different display forms. The processing in Step S1905 is similar to that in Step S4005 described in FIG. 4B.

This processing in the control/processing section 2202 may be performed by the control/processing section 2102.

Processing of Control/Processing Section 2102 in Third Modification of Embodiment 2

Figure 20:
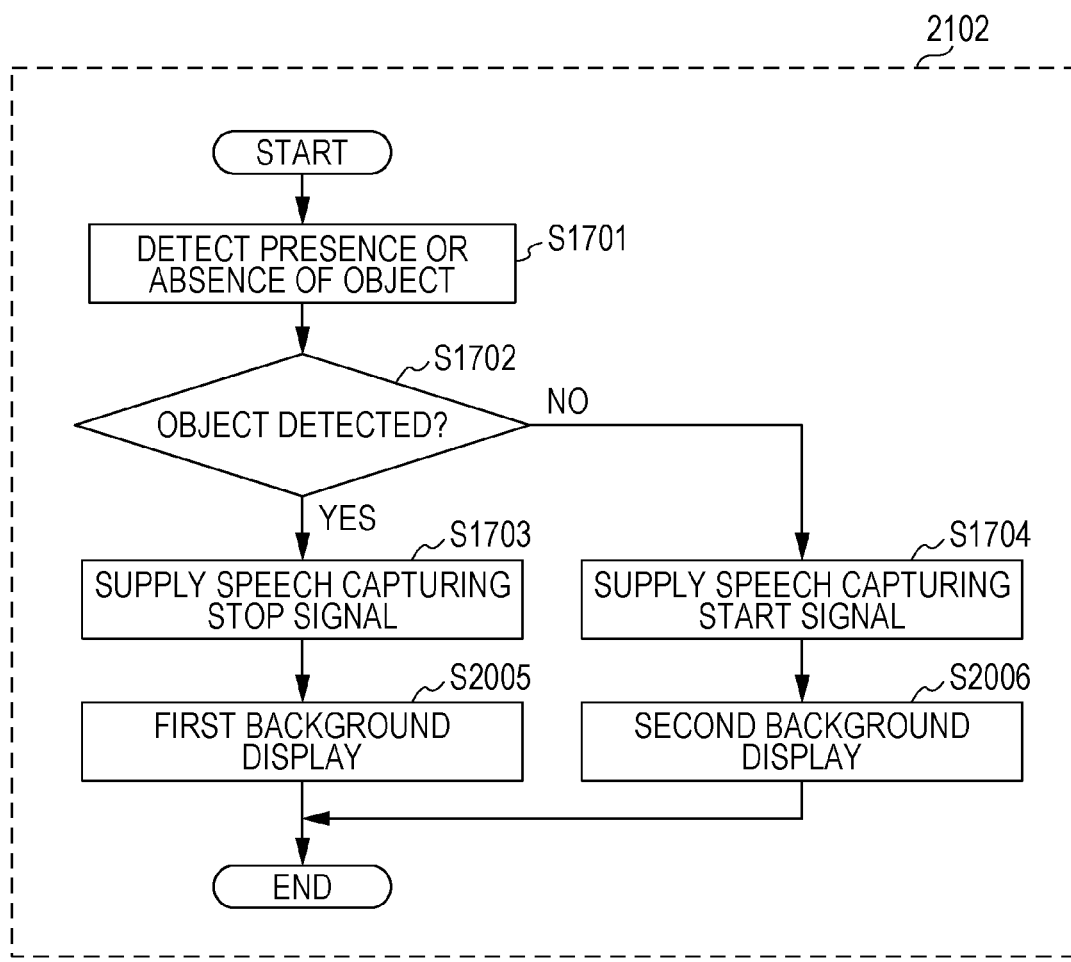
FIG. 20 is a flow chart illustrating an example of processing of a control/processing section of a mobile terminal according to the third modification of Embodiment 2.

Processing of the control/processing section 2102 in the third modification of Embodiment 2 is described below with reference to FIG. 20. In the present modification, the control/processing section 2102 includes a display control unit 1204.

Processing in Steps S1701 through Step S1704 is similar to that described with reference to FIG. 17 and therefore description thereof is not repeated.

After a speech capturing stop signal is supplied in Step S1703, the display control unit 1204 controls background display of the mobile terminal 1010 to be first background display in Step S2005.

Meanwhile, after a speech capturing start signal is supplied in Step S1704, the display control unit 1204 controls background display of the mobile terminal 1010 to be second background display in Step S2006.

The first background display and the second background display described in Steps S2005 and S2006 are described with reference to FIGS. 21A and 21B.

Figure 21A:
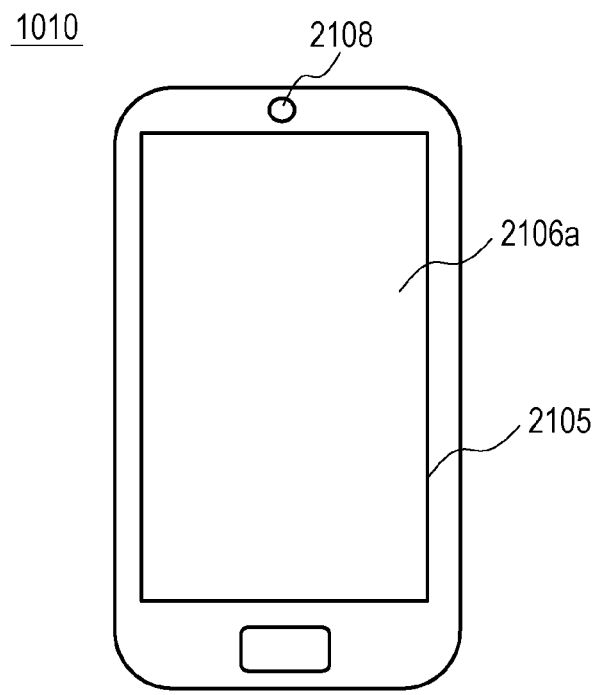
FIG. 21A is a diagram illustrating an example of second background display on a mobile terminal of the present system according to Embodiment 2.

FIG. 21A illustrates an example of the second background display on the mobile terminal 1010. In the state of the second background display, "absence" of an object is being detected. That is, speech is being captured, i.e., an application is operating in a usual manner. Accordingly, a usual screen is displayed. The usual screen includes, for example, a background image of a single color.

Figure 21B:
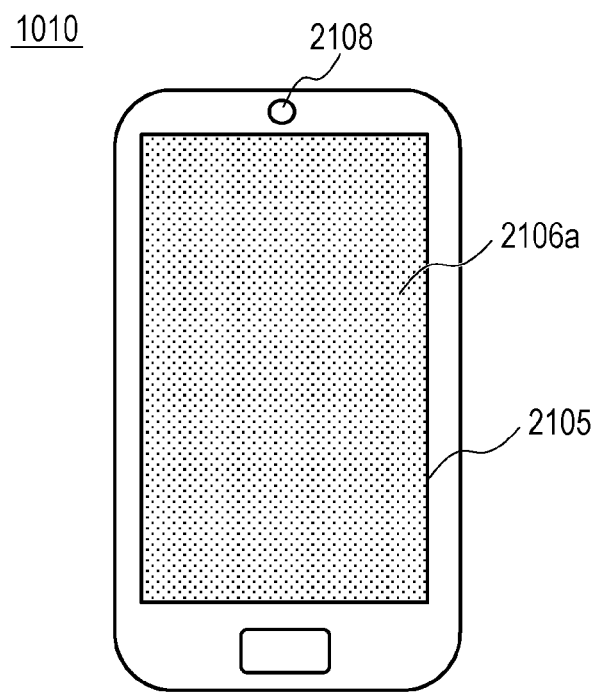
FIG. 21B is a diagram illustrating an example of first background display on a mobile terminal of the present system according to Embodiment 2.

FIG. 21B illustrates an example of the first background display on the mobile terminal 1010. In the state of the first background display, "presence" of an object is being detected. That is, capturing of speech is being stopped, i.e., a user is performing an operation of intentionally covering the proximity detecting section 2108 of the mobile terminal 1010. In the state of the first background display, a background image different from that displayed in the state of the second background display is displayed.

The background image displayed in the state of the first background display can be any image different from that displayed in the state of the second background display.

According to the present modification, background display of the mobile terminal 1010 changes after a user does an action such as covering the proximity detecting section 2108 with a hand. This allows the user to easily understand that speech recognition is currently being stopped. Especially in this state, the user is putting a hand over the mobile terminal 1010 with the intention of covering the proximity detecting section 2108, and as a natural consequence, most of a display region of the display section 2105 is covered with the hand and the like. Accordingly, even if a text message such as "speech recognition is currently being stopped" is displayed on part of the screen such as the center of the screen, the user cannot read the text message. Therefore, according to the present modification, the background display of the whole screen is changed. This also changes display of part of the screen that is not covered with the hand. As a result, the user can visually recognize the state.

In the state of Step S2006, it is likely that the screen is covered with a user's hand, and it is therefore desirable that the second background display be display that attracts user's attention more than the first background display. User's attention may be attracted by using a color (red or yellow) that attracts user's attention more or by displaying a texture image or a line image as illustrated in FIG. 21B. Display may be controlled so that the second background display has a higher luminance than the first background display. The first background display may be display that "displays nothing". This makes a change at switching to the second background display larger, thereby allowing a user to more easily grasp a change of the state of speech capturing.

Contrary to the above description, the second background display may be display that is less noticeable than the first background display or has a lower luminance than the first background display. In this case, display becomes dark, for example, when a user covers the screen with a hand. This suggests to the user that the system is not working (speech capturing is being stopped). It is therefore possible to provide a user interface that suits more user's intuition.

Figure 18:
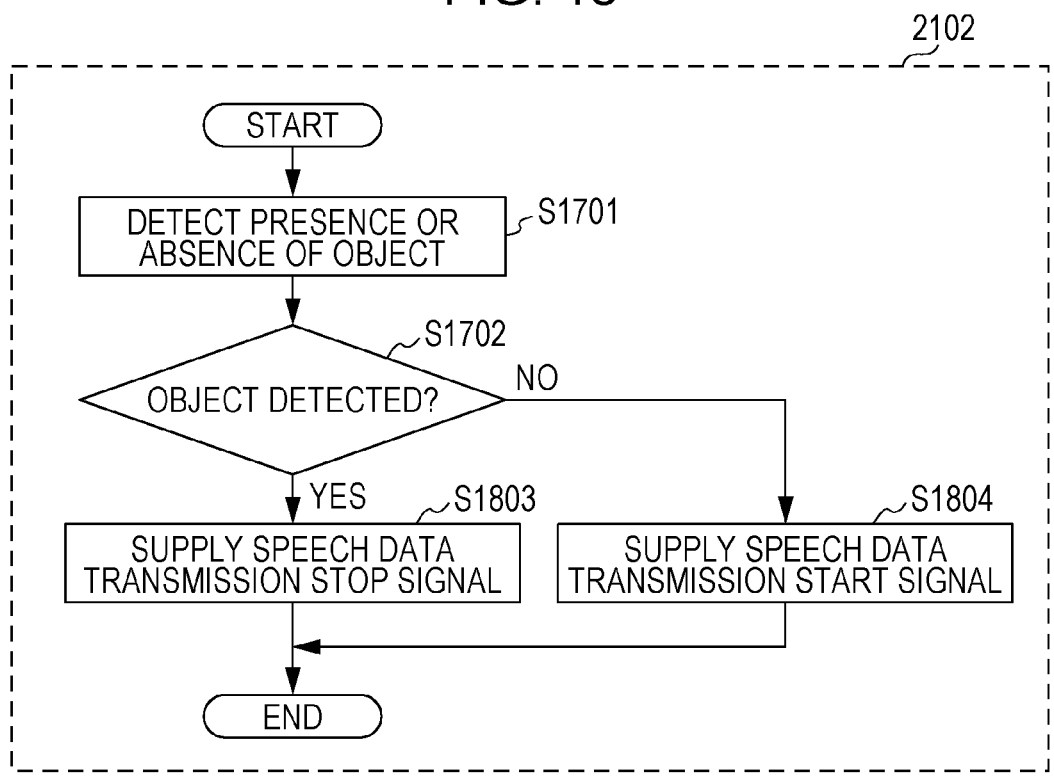
FIG. 18 is a flow chart of the present system illustrating an example of processing of a control/processing section of a mobile terminal according to the first modification of Embodiment 2.

In the present modification, Step S1703 and Step S1704 may be replaced with Step S1803 and Step S1804 of FIG. 18. Even in a case where a speech data transmission stop signal is supplied in Step S1803, captured speech may be recorded in the recording section 2103 or the like, and images as illustrated in FIGS. 9A through 9C of Embodiment 1 may be displayed.

Processing of Control/Processing Section 2102 in Fourth Modification of Embodiment 2

Figure 22:
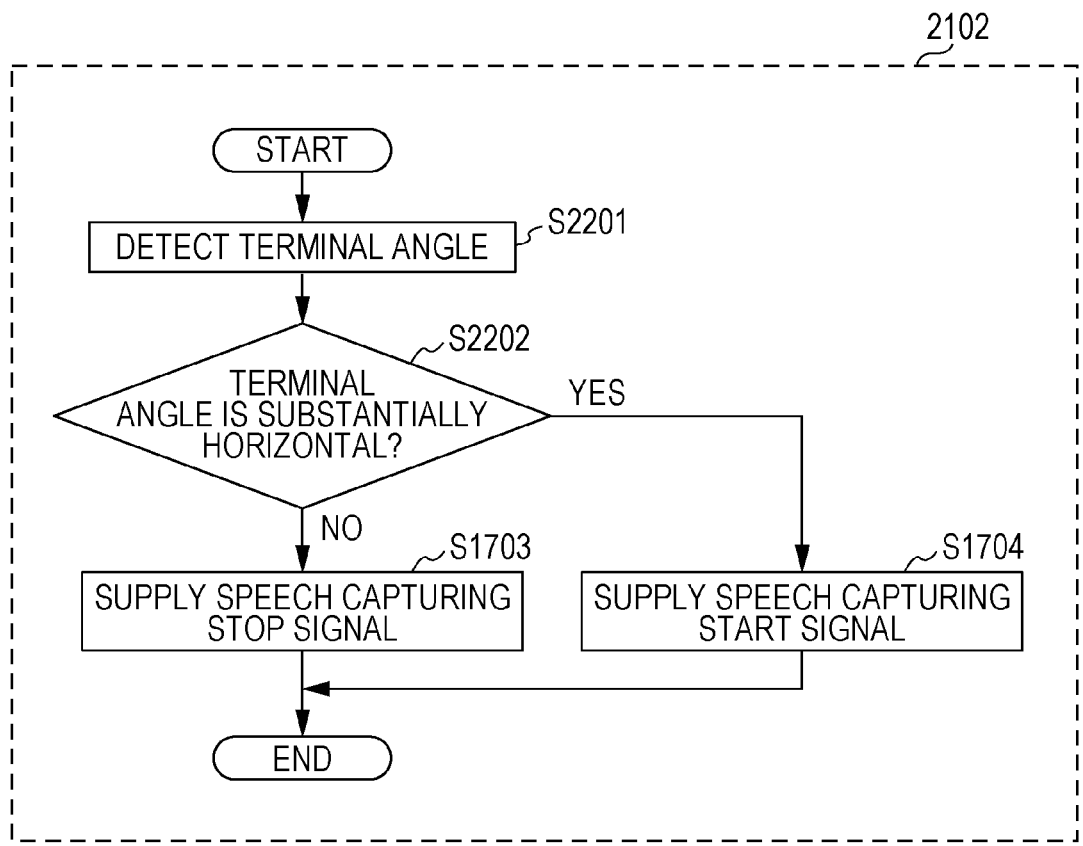
FIG. 22 is a flow chart illustrating an example of processing of a control/processing section of a mobile terminal according to the fourth modification of Embodiment 2.

Processing of the control/processing section 2102 in the fourth modification of Embodiment 2 is described below with reference to FIG. 22. In the present modification, the mobile terminal 1010 includes an inclination detecting section 2109. The control/processing section 2102 includes a terminal angle detecting unit 1205.

In Step S2201, the inclination detecting section 2109 of the mobile terminal 1010 detects an angle of a mobile terminal. The angle of the mobile terminal is an angle of a plane including a display screen of the mobile terminal 1010 with respect to a horizontal plane. The horizontal plane is, for example, a plane parallel with the floor or ground. For example, in a case where the plane including the display screen of the display section 2105 is parallel with the horizontal plane, a detected angle is 0 degree.

In Step S2202, the terminal angle detecting unit 1205 of the control/processing section 2102 detects whether or not the angle of the mobile terminal 1010 detected in Step S1204 is substantially horizontal. The term "substantially horizontal" as used herein refers to a state in which the angle of the mobile terminal 1010 is, for example, within a range of −10 degrees to +10 degrees. That is, a state in which the mobile terminal 1010 is placed on a desk or the like is a horizontal state.

In a case where the terminal angle detecting unit 1205 detects in Step S2202 that the angle of the mobile terminal 1010 is substantially horizontal, the processing proceeds to Step S1704. In Step S1704, a speech capturing start signal is supplied. The processing in Step S1704 is similar to that described above and therefore description thereof is not repeated.

In a case where the terminal angle detecting unit 1205 detects in Step S2202 that the angle of the mobile terminal 1010 is not substantially horizontal, the processing proceeds to Step S1703. In Step S1703, a speech capturing stop signal is supplied. The processing in Step S1703 is similar to that described above and therefore description thereof is not repeated.

In the present modification, in a state in which the mobile terminal 1010 is placed on a desk in a meeting or the like, the terminal angle detecting unit 1205 detects that the angle of the mobile terminal 1010 is substantially horizontal, and therefore speech capturing is performed.

When the terminal angle detecting unit 1205 ceases to detect that the angle of the mobile terminal 1010 is substantially horizontal, for example, because a user holds up the mobile terminal 1010, speech capturing is stopped. With this arrangement, the user can easily give an instruction to stop capturing of speech. In addition, it is possible to obtain effects similar to those described in the above embodiments.

In the present embodiment, an arrangement is also possible in which in a case where the terminal angle detecting unit 1205 detects in Step S2202 that the angle of the mobile terminal 1010 is substantially horizontal, the processing proceeds to Step S1703, in which a speech capturing stop signal is supplied, whereas in a case where the terminal angle detecting unit 1205 detects in Step S2202 that the angle of the mobile terminal 1010 is not substantially horizontal, the processing proceeds to Step S1704, in which a speech capturing start signal is supplied. With the arrangement, it is possible to further restrict phrases recorded as minutes of a meeting.

In the present modification, Step S1703 and Step S1704 may be replaced with Step S1803 and Step S1804 of FIG. 18. Even in a case where the speech data transmission stop signal is supplied in Step S1803, captured speech may be recorded in the recording section 2103 or the like, and images as illustrated in FIGS. 9A through 9C of Embodiment 1 may be displayed.

Processing of Control/Processing Section 2102 in Fifth Modification of Embodiment 2

Figure 23:
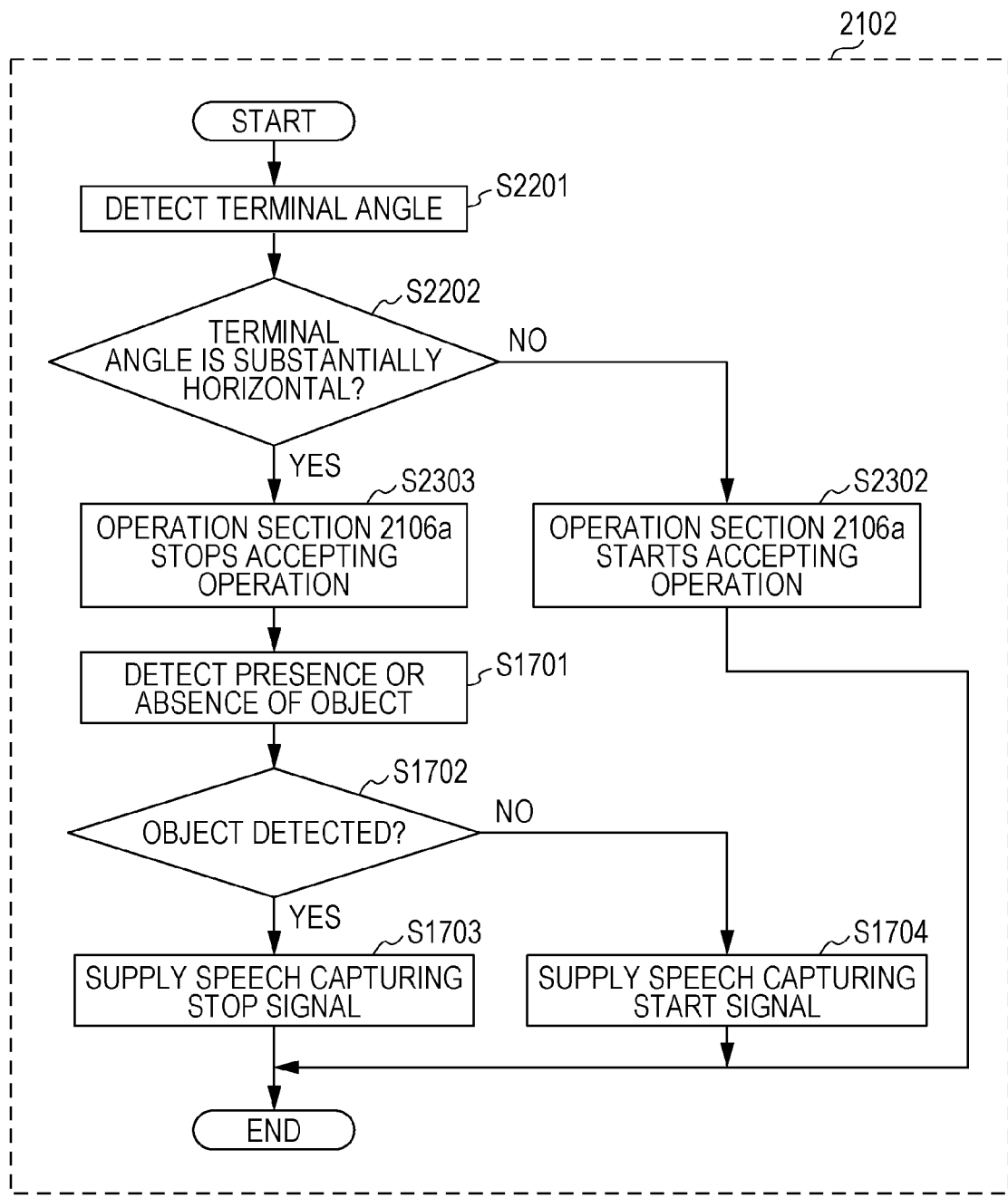
FIG. 23 is a flow chart illustrating an example of processing of a control/processing section of a mobile terminal according to the fifth modification of Embodiment 2.

Processing of the control/processing section 2102 in the fifth modification of Embodiment 2 is described below with reference to FIG. 23. In the present modification, the mobile terminal 1010 includes an inclination detecting section 2109. The control/processing section 2102 includes a terminal angle detecting unit 1205.

Processing in Step S2201 and Step S2202 is similar to that described with reference to FIG. 22 and therefore description thereof is not repeated.

In a case where it is determined in Step S2202 that a terminal angle is substantially horizontal, the operation section 2106a stops accepting operation in Step S2203. For example, the operation section 2106a is a touch panel type operation section. In this case, the operation section 2106a is controlled not to work in response to a user's touch operation.

In a case where it is determined in Step S2202 that a terminal angle is not substantially horizontal, the operation section 2106*a* resumes accepting operation. That is, the operation section 2106*a* shifts to a state in which the operation section 2106*a* works upon detection of a user's touch operation. Note that speech capturing may start in Step S2202.

After Step S2303, the processing proceeds to Steps S1701 through S1704. Processing in Steps S1701 through S1704 is similar to that described in FIG. 17 and therefore description thereof is not repeated.

As described above, in the present modification, the mobile terminal 1010 is controlled so as not to accept operation from the operation section 2106*a* (touch panel) in a case where the mobile terminal 1010 is in a horizontal state. This makes it possible to prevent user's unintentional mistaken input even in a case where the user touches the touch panel when performing an action of covering the mobile terminal 1010 with a hand in Step S1701. In a case where the user wants to resume touch panel operation, the user can perform touch operation again by holding up the mobile terminal 1010 and changing the terminal angle.

In the above embodiments and the modifications of the embodiments, a user interface that allows a user to easily give an instruction concerning utterances which the user want to record as minutes of a meeting and utterances which the user does not want to record as minutes of a meeting has been described. An example in which detection of proximity of an object by the mobile terminal 1010 or a change of the angle of the mobile terminal 1010 is used as a trigger (input) has been described above. Examples in which stopping speech capturing, stopping transmission of captured speech to the server device 2200, or specifying a deleted phrase in the server device 2200 is output triggered by this input have been described. However, the above embodiments and the modifications of the present embodiments are not limited to these examples. Another example of the trigger is touching the display section 2105 (detection of a touch by the operation section 2106*a*). Another example of output is stopping (starting) speech recognition or starting capturing of not only speech but also an image (moving image).

Figure 24A:
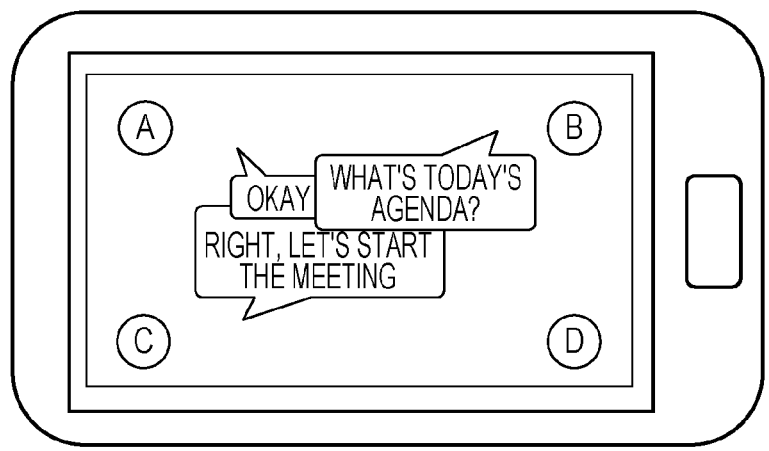
FIG. 24A is a diagram illustrating an example of display content displayed on the mobile terminal of the present system according to Embodiment 2.
Figure 24B:
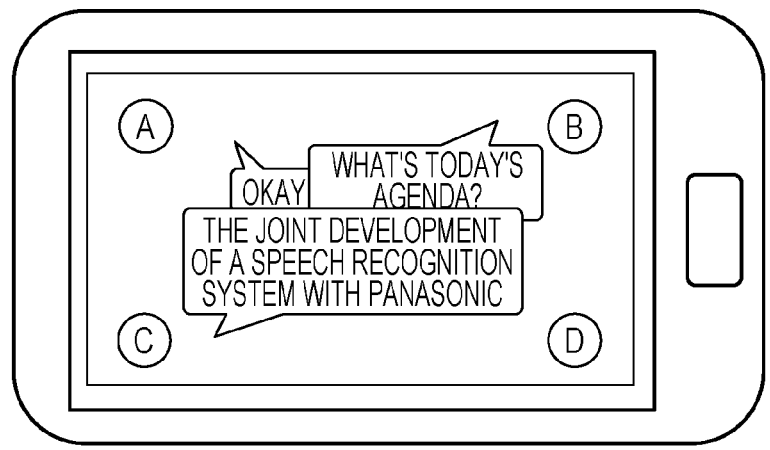
FIG. 24B is a diagram illustrating an example of display content displayed on the mobile terminal of the present system according to Embodiment 2.

Display examples of created minutes of a meeting are illustrated in FIGS. 9A through 9C of Embodiment 1, but the above embodiments and the modifications of the embodiments are not limited to these. For example, the minutes of the meeting may be displayed as illustrated in FIGS. 24A and 24B. FIGS. 24A and 24B illustrates an example of display content displayed on a mobile terminal.

In the display example illustrated in FIGS. 24A and 24B, utterances of meeting participants are displayed so as to overlap in chronological order. In this example, the positional relationship of the participants in the meeting is synchronized with displayed positions of the participants. The positional relationship of the participants is input in advance by a user. Alternatively, the positional relationship of the participants may be estimated on the basis of speech data captured by the mobile terminals 1010 of the respective participants and be reflected in the displayed positions.

It is unnecessary that utterances be displayed so as to overlap each other as illustrated in FIGS. 24A and 24B, but it is desirable that the utterances be displayed in a manner such that a temporal relationship of the utterances can be understood. For example, it is also possible to employ a display method in which an utterance that is later in time is displayed more brightly and an utterance that is earlier in time is displayed darkly. Such an arrangement is also possible in which the time which a user want to display is changed by a pinch-in and pinch-out actions on the touch panel of the operation section 2106*a* when viewing minutes of a meeting. The pinch-in action is an action of touching two points on the touch panel and then shortening the distance between these two points. It is desirable that utterances be sequentially displayed in chronological order by the pinch-in action. That is, transition from the state of FIG. 24A to the state of FIG. 24B can be achieved by the pinch-in action. The pinch-out action is an action of touching two points on the touch panel and then increasing the distance between these two points. It is desirable that utterances be sequentially displayed in the reverse chronological order by the pinch-out action. That is, transition from the state of FIG. 24B to the state of FIG. 24A can be achieved by the pinch-out action. Similar operation may be achieved by flicking the screen up and down or from side to side. Flicking is an action of touching one point and then shifting the touch position to a different position.

An arrangement is possible in which the sound volume of speech (speech pressure level) acquired by the control/processing section 2102 (the control/processing section 2202) is detected, and the size of displayed characters is changed on the basis of the detected sound volume. With the arrangement, a phrase that is uttered more loudly is displayed in a larger size. This makes it possible to intuitively specify more important utterances in a meeting when running over minutes of a meeting.

Alternatively, an arrangement is possible in which the sound volume of captured speech (speech pressure level) is detected, and the color of displayed characters is changed on the basis of the detected sound volume. For example, an utterance whose level is a threshold value or higher is displayed in red. This also makes it possible to easily specify more important utterances. Such an example is also possible in which an utterance whose level is a threshold value or lower is displayed in blue. By thus displaying utterances in different colors, the feeling of a speaking participant can be projected in minutes of a meeting.

Other Modifications (1) A method of the present disclosure for displaying text phrases on a display device in a system for converting captured speech data into text phrases includes:

extracting a specific phrase in the text phrases;

specifying a display deletion candidate character string which is a candidate character string whose display is to be deleted among the text phrases on the basis of the extracted specific phrase; and displaying, in different display forms, the display deletion candidate character string and a character string other than the display deletion candidate character string among the text phrases.

(2) In the method, a character string immediately before the specific phrase or a character string immediately after the specific phrase may be specified as the display deletion candidate character string in accordance with the extracted specific phrase by referring to a table stored in the system in which the positional relationship between the specific phrase and a character string whose display is to be deleted is managed.

(3) In the method, the display device may be controlled to be in a display state that accepts a command to delete display of the display deletion candidate character string in a case where the display deletion candidate character string is displayed.

(4) In the method, the display state that accepts a command to delete display of the display deletion candidate character string may be a state in which a button for deleting display of the display deletion candidate character string is displayed in a region other than a region of the display device in which the text phrases are displayed.

(5) In the method, the display state that accepts a command to delete display of the display deletion candidate character string may be a state in which the display deletion candidate character string can be deleted when a user designates a peripheral region of the display deletion candidate character string on the display device.

(6) In the method, the display deletion candidate character string may be displayed at a lower luminance than other character strings.

(7) A terminal device of the present disclosure includes:
a proximity detecting section that detects proximity of an object;
a speech capturing section that captures speech; and
a control/processing section that controls at least the speech capturing section,
the control section controlling the speech capturing section not to capture speech only while the proximity detecting section is detecting proximity of an object during operation of a predetermined system.

(8) The predetermined system may be a system for converting the speech data into text.

(9) A terminal device of the present disclosure includes:
a proximity detecting section that detects proximity of an object;
a speech capturing section that captures speech;
a communication section that transmits the speech data captured by the speech capturing section to an external device; and
a control/processing section that controls at least the communication section,
the control section controlling the communication section not to transmit captured speech to the external device only while the proximity detecting section is detecting proximity of an object during operation of a predetermined system.

(10) The predetermined system may be a system for converting the speech data into text.

(11) A terminal device of the present disclosure includes:
a proximity detecting section that detects proximity of an object;
a speech capturing section that captures speech;
a communication section that transmits the speech data captured by the speech capturing section to an external device that converts the speech data into text; and
a control/processing section that controls at least the communication section,
the control section controlling, during operation of a predetermined system, the communication section to transmit the speech data and information indicating that proximity of an object is being detected by the proximity detecting section to the external device while the proximity detecting section is detecting proximity of the object and to transmit only the speech data to the external device while the proximity detecting section is not detecting proximity of an object.

(12) The predetermined system may be a system for converting the speech data into text.

The present disclosure is applicable to a method for controlling a speech-recognition text-generation system and a method for controlling a mobile terminal.

A method for controlling a speech-recognition text-generation system and a method for controlling a mobile terminal according to the present disclosure have industrial applicability to a remote meeting system, a remote meeting device, a system for creating minutes of a meeting, a device for creating minutes of a meeting, a speech recognition application for a mobile terminal (smartphone/tablet), and the like.

What is claimed is:

1. A method for controlling a device used in a speech-recognition system, in which the device captures speech, the method comprising:
    placing the device on a flat surface;
    detecting whether the device is in a substantially horizontal position while the device is laying on the flat surface;
    determining a presence or an absence of an object in proximity to the device while the device is laying on the flat surface in the substantially horizontal position; and
    controlling capturing speech or not capturing speech in accordance with the determination,
    wherein the capturing is performed using a microphone of the device,
    wherein the device includes a light-emitting part emitting light; and
    wherein when the controlling is changed from starting capturing to stopping capturing, or from stopping capturing to starting capturing, the light-emitting part emits visible light and changes color or luminosity of the emitting.

2. The method according to claim 1,
    wherein the capturing is stopped when it is determined that an object is in proximity to the device, and
    wherein the capturing is started when it is determined that no object is in proximity to the device.

3. The method according to claim 1,
    wherein the capturing is started when it is determined that an object is in proximity to the device, and
    wherein the capturing is stopped when it is determined that no object is in proximity to the device.

4. The method according to claim 1,
    wherein the device includes a display displaying a speech recognition result, and
    wherein the light-emitting part is the display.

5. The method according to claim 3,
    wherein the device includes a display displaying a speech recognition result, and
    wherein the light-emitting part is the display.

6. A method for controlling a device used in a speech-recognition system, in which the device captures speech, the method comprising:
    placing the device on a flat surface;
    detecting whether the device is in a substantially horizontal position while the device is laying on the flat surface;
    determining a presence or an absence of an object in proximity to the device while the device is laying on the flat surface in the substantially horizontal position; and
    controlling transmitting captured speech to an external device for recognizing the captured speech or not transmitting captured speech to an external device in accordance with the detecting and the determining,
    wherein the captured speech is not transmitted to the external device while the object is determined to be in proximity to the device,
    wherein the capturing is performed using a microphone of the device, and
    wherein recognizing the captured speech is performed using a processor of the external device.

7. A method for controlling a device used in a speech-recognition system, in which the device captures speech, the method comprising:
- placing the device on a flat surface;
- detecting whether the device is in a substantially horizontal position while the device is laying on the flat surface;
- determining a presence or an absence of an object in proximity to the device while the device is laying on the flat surface in the substantially horizontal position;
- capturing speech using a microphone of the device,
- wherein the captured speech is not transmitted to the external device while the object is determined to be in proximity to the device; and
- controlling recognizing the captured speech or not in accordance with the detecting and the determining.

8. A method for controlling a device used in a speech-recognition system, in which the device captures speech, the method comprising,
- placing the device on a flat surface;
- detecting whether the device is in a substantially horizontal position while the device is laying on the flat surface;
- determining a presence or an absence of a user's hand in proximity to the device while the device is laying on the flat surface in the substantially horizontal position; and
- controlling capturing speech or not in accordance with the detecting and the determining,
- wherein the capturing speech is stopped upon a determination that the user's hand is in proximity to the device, and
- wherein the capturing is performed using a microphone of the device.

* * * * *